(12) United States Patent
Xu et al.

(10) Patent No.: US 10,531,445 B2
(45) Date of Patent: Jan. 7, 2020

(54) METHODS AND APPARATUS FOR MANAGING MACHINE-TYPE COMMUNICATIONS

(71) Applicant: QUALCOMM Incorporated, San Diego, CA (US)

(72) Inventors: Hao Xu, San Diego, CA (US); Wanshi Chen, San Diego, CA (US); Yongbin Wei, San Diego, CA (US); Peter Gaal, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/450,543

(22) Filed: Mar. 6, 2017

(65) Prior Publication Data

US 2017/0180914 A1   Jun. 22, 2017

Related U.S. Application Data

(63) Continuation of application No. 13/844,176, filed on Mar. 15, 2013, now Pat. No. 9,591,429.

(Continued)

(51) Int. Cl.
*H04W 4/00* (2018.01)
*H04W 28/06* (2009.01)
(Continued)

(52) U.S. Cl.
CPC ........ *H04W 72/042* (2013.01); *H04B 7/0413* (2013.01); *H04W 4/70* (2018.02);
(Continued)

(58) Field of Classification Search
CPC . H04W 72/042; H04W 16/28; H04W 84/042; H04W 4/005; H04W 28/06; H04W 48/12; H04B 7/0413
(Continued)

(56) References Cited

U.S. PATENT DOCUMENTS 8,125,892 B1   2/2012 Jokimies et al.
8,848,638 B2   9/2014 Axmon et al.
(Continued)

FOREIGN PATENT DOCUMENTS

CN   102026372 A   4/2011
CN   102355728 A   2/2012
(Continued)

OTHER PUBLICATIONS

ETRI "R1-120702 Identification of DL-Control Information at the low-cost MTC UEs" Feb. 6-10, 2012.*
(Continued)

*Primary Examiner* — Maharishi V Khirodhar
*Assistant Examiner* — Kenneth P Hunt
(74) *Attorney, Agent, or Firm* — Linda G. Gunderson; Arent Fox LLP

(57) ABSTRACT

The described aspects include methods and apparatus providing MTC in a wireless network. In an aspect, a narrow bandwidth within a wide system bandwidth is allocated for communicating data related to MTC. MTC control data generated for communicating over one or more MTC control channels for an MTC UE within the narrow bandwidth is transmitted over the one or more MTC control channels. The one or more MTC channels are multiplexed with one or more legacy channels over the wide system bandwidth. Other aspects are provided for transmission mode and content of the MTC control data or other MTC data.

25 Claims, 25 Drawing Sheets

Related U.S. Application Data

(60) Provisional application No. 61/648,004, filed on May 16, 2012, provisional application No. 61/646,169, filed on May 11, 2012.

(51) Int. Cl.

| | |
|---|---|
| *H04W 48/12* | (2009.01) |
| *H04W 72/04* | (2009.01) |
| *H04B 7/0413* | (2017.01) |
| *H04W 16/28* | (2009.01) |
| *H04W 4/70* | (2018.01) |
| *H04W 84/04* | (2009.01) |

(52) U.S. Cl.
 CPC .......... *H04W 16/28* (2013.01); *H04W 28/06* (2013.01); *H04W 48/12* (2013.01); *H04W 84/042* (2013.01)

(58) Field of Classification Search
 USPC ......................................................... 370/328
 See application file for complete search history.

(56) References Cited

U.S. PATENT DOCUMENTS

| | | | |
|---|---|---|---|
| 9,510,132 B2 | 11/2016 | Xu et al. | |
| 2009/0052381 A1 | 2/2009 | Gorokhov et al. | |
| 2010/0040008 A1 | 2/2010 | Diachina et al. | |
| 2010/0203886 A1 | 8/2010 | Nobukiyo et al. | |
| 2011/0201376 A1 | 8/2011 | Hu et al. | |
| 2011/0205982 A1 | 8/2011 | Yoo et al. | |
| 2011/0222485 A1 | 9/2011 | Nangia et al. | |
| 2011/0255483 A1 | 10/2011 | Xu et al. | |
| 2011/0264740 A1 | 10/2011 | Diachina et al. | |
| 2011/0268046 A1 | 11/2011 | Choi et al. | |
| 2011/0270984 A1 | 11/2011 | Park et al. | |
| 2011/0274075 A1 | 11/2011 | Lee et al. | |
| 2011/0310854 A1 | 12/2011 | Zou et al. | |
| 2012/0057476 A1 | 3/2012 | Chan et al. | |
| 2012/0082248 A1 | 4/2012 | Han et al. | |
| 2012/0263106 A1 | 10/2012 | Lee et al. | |
| 2012/0327895 A1 | 12/2012 | Wallen et al. | |
| 2013/0028184 A1 | 1/2013 | Lee et al. | |
| 2013/0039284 A1* | 2/2013 | Marinier | H04L 5/001 370/329 |
| 2013/0083753 A1* | 4/2013 | Lee | H04W 72/0453 370/329 |
| 2013/0102342 A1 | 4/2013 | Tesanovic et al. | |
| 2013/0114517 A1* | 5/2013 | Blankenship | H04L 5/0053 370/329 |
| 2013/0114521 A1* | 5/2013 | Frenne | H04L 5/0053 370/329 |
| 2013/0114587 A1* | 5/2013 | Khoryaev | H04L 5/0094 370/343 |
| 2013/0148623 A1* | 6/2013 | Nishio | H04L 1/004 370/329 |
| 2013/0194956 A1* | 8/2013 | Sartori | H04W 24/02 370/252 |
| 2013/0195020 A1* | 8/2013 | Frederiksen | H04W 72/042 370/329 |
| 2013/0195041 A1 | 8/2013 | Papasakellariou et al. | |
| 2013/0250878 A1 | 9/2013 | Sayana et al. | |
| 2013/0265980 A1 | 10/2013 | Zhu et al. | |
| 2013/0294363 A1 | 11/2013 | Feng et al. | |
| 2013/0301524 A1 | 11/2013 | Xu et al. | |
| 2013/0301525 A1 | 11/2013 | Xu et al. | |
| 2013/0301549 A1* | 11/2013 | Chen | H04W 4/90 370/329 |
| 2013/0301552 A1* | 11/2013 | Xu | H04W 4/005 370/329 |
| 2013/0308572 A1 | 11/2013 | Sayana et al. | |
| 2013/0316700 A1 | 11/2013 | Beale | |
| 2014/0086188 A1* | 3/2014 | Hoymann | H04L 5/0053 370/329 |
| 2014/0126508 A1* | 5/2014 | Young | H04W 4/005 370/329 |
| 2014/0233470 A1 | 8/2014 | Kim et al. | |
| 2014/0286281 A1* | 9/2014 | Jang | H04L 5/0028 370/329 |
| 2014/0314048 A1* | 10/2014 | Yi | H04W 48/12 370/332 |
| 2014/0341141 A1* | 11/2014 | Nguyen | H04W 16/14 370/329 |
| 2014/0357272 A1* | 12/2014 | Axmon | H04W 48/12 455/434 |
| 2014/0376454 A1 | 12/2014 | Boudreau et al. | |
| 2015/0065154 A1 | 3/2015 | Van Phan et al. | |
| 2015/0078191 A1 | 3/2015 | Jöngren et al. | |
| 2015/0092566 A1 | 4/2015 | Balachandran et al. | |
| 2015/0117372 A1 | 4/2015 | Sundberg et al. | |
| 2015/0146629 A1* | 5/2015 | Ranta-aho | H04W 72/0453 370/329 |
| 2015/0245162 A1 | 8/2015 | Chao | |
| 2016/0065333 A1* | 3/2016 | Blankenship | H04W 72/042 370/329 |
| 2016/0127952 A1 | 5/2016 | You et al. | |
| 2017/0118710 A1* | 4/2017 | Papasakellariou | H04W 72/042 |
| 2017/0164340 A1 | 6/2017 | Xu et al. | |
| 2017/0280273 A1 | 9/2017 | Xu et al. | |

FOREIGN PATENT DOCUMENTS

| | | |
|---|---|---|
| WO | 2009038429 A2 | 3/2009 |
| WO | 2010105402 A1 | 9/2010 |
| WO | 2011100540 A1 | 8/2011 |

OTHER PUBLICATIONS

NEC Group "R1-120259 Maximum bandwidth reduction for low-cost MTC UE based on LTE" Feb. 6-10, 2012.*
ZTE Corporation "R1-120290 TP for evaluation/analysis of reduction of maximum bandwidth" Feb. 6-10, 2012.*
IPWireless Inc "R1-120799 Backwards compatible support for reduced bandwidth LTE UEs" Feb. 6-10, 2012.*
R. Ratasuk, J. Tan and A. Ghosh, "Coverage and Capacity Analysis for Machine Type Communications in LTE," 2012, IEEE 75th Vehicular Technology Conference (VTC Spring), Abstract, doi: 10.1109/VETECS.2012.6240186 http://ieeexplore.ieee.org/stamp/stamp.jsp?tp=&arnumber=6240186&isnumber=623984.*
Alcatel-Lucent et al: "Load Distribution for MTC Devices", 3GPP Draft* R2103759_MTC_L0AD_Distribution_Disc-R3, 3rd Generation Partnership Project (3GPP), Mobile Competence Centre ; 650, Route des Lucioles ; F-06921 Sophia-Antipolis Cedex; France, vol. RAN WG2, No. Stockholm, Sweden; 20100628, Jun. 28, 2010, (Jun. 22, 2010), XP050451215, [retrieved on Jun. 22, 2010], section 2. Discussion.
ETRI: "Identification of DL-Control Information at the low-cost MTC UEs", 3GPP Draft; R1-120702, 3rd Generation Partnership Project (3GPP), Mobile Competence Centre; 650, Route des Lusioles; F-06921 Sophia-Antipolis Cedex; France, vol. RAN WG1, No. Dresden, Germany; 20120206-201202140, Feb. 1, 2012 (Feb. 1, 2012), XP050563267.
Huawei et al., "Reducing peak rate and transmission modes for low-cost MTC UE", 3GPP Draft; R1-120053, 3rd Generation Partnership Project (3GPP), Mobile Competence Centre 650, Route des Lucioles F-06921 Sophia-Antipolis Cedex France, vol. RAN WG1, No. Dresden, Germany; 20120206-20120210. Jan. 31, 2012 (Jan. 31, 2012). XP050562640, [retrieved on Jan. 31, 2012].
International Search Report and Written Opinion—PCT/US2013/037397—ISA/EPO—dated Jul. 25, 2013.
IPWireless Inc: "Backwards compatible support for reduced bandwidth MTC LTE UEs", 3GPP Draft; R1-120799, 3rd Generation Partnership Project (3GPP), Mobile Competence Centre; 650, Route des Lucioles; F-06921 Sophia Antipolis Cedex; France, vol. RAN WG1, No. Dresden, Germany; 20120206-20120210, Jan. 31, 2012 (Nov. 31, 2012), XP050563142.

(56) References Cited

OTHER PUBLICATIONS

Mediatek Inc: "On Required System Functionalities for MTC UEs Operating in Enhanced Coverage Mode", 3GPP Draft; RI-130218 on Required System Functionalities for MTC UES Operating in Enhanced Coverage Mode, 3rd Generation Partnership Project (3GPP), Mobile Competence Centre ; 650, Route des Lucioles vol. RAN WGI, No. St Julian; 20130128-20130201 Jan. 19, 2013 (Jan. 19, 2019), XP050663598, Retrieved from the Internet: URL:https://ww.3gpp.org/ftp/tsp.ran/WG1_RL1/TSGR1_72/Docs/.

NEC Group: "Maximum Bandwidth Reduction for Low-Cost MTC UE based on LTE", 3GPP Draft; R1-120259, 3rd Generation Partnership Project (3GPP), Mobile Competence Centre, 650, Route des Lucioles, F-06921 Sophia-Antipolis Cedex, France, vol. RAN WG1, No. Dresden, Germany, 20120206-20120210, Jan. 31, 2012 (Jan. 31, 2012), 6 Pages, XP050562813, title section 2.2 Bandwidth sharing.

Nokia Siemens Networks et al. "Transmission modes for low-cost MTC". 3GPP Draft; R1-121297, 3rd Generation Partnership Project (3GPP), Mobile Competence Centre; 650. Route des Lucioles ; F-06921 Sophia-Antipolis Cedex ; France. val. RAN WG1. No. Jeju. Korea; 20120326-20120330. Mar. 20, 2012 (Mar. 20, 2012). XP050599587. [retrieved on Mar. 20, 2012].

Qualcomm Incorporated: "Additional Comments on Cost Evaluation for MTC", 3GPP Draft; R1-122804 Additional Comments on Cost Evaluation for MTC, 3rd Generation Partnership Project (3GPP), Mobile Competence Centre ; 650, Route Des Lucioles ; F-06921 Sophia-Antipolis Cedex , France, vol. RAN WG1, No. Prague, Czech Republic; May 21, 2012-May 25, 2012, May 12, 2012 (May 12, 2012), pp. 1-3, XP050600981, [retrieved on May 12, 2012] p. 2, line 8—p. 3, line 4 figures 1.2.

Qualcomm Incorporated: "Downlink transmission modes for MTC". 3GPP Draft; R1-122802 Downlink Transmission Modes for MTC. 3rd Generation Partnership Project (3GPP). Mobile Competence Centre; 650. Route Des Lucioles ; F-06921 Sophia-Antipolis Cedex ; France. val. RAN WG1. No. Prague. Czech Republic; May 21, 2012-May 25, 2012. May 12, 2012 (May 12, 2012). XP050600980. [retrieved on May 12, 2012].

Samsung: "Impact of bandwidth reduction on low-cost MTC UE procedures", 3GPP Draft; R1-121654 Impact of BW, Reduction on Low-Cost MTC UE Procedures, 3rd Generation Partnership Project (3GPP), Mobile Competence Centre ; 650, Route Des Lucioles ; F-06921 Sophia-Antipolis Cedex; France, vol. RAN WGI, No. Jeju, Korea; Mar. 26, 2012-Mar. 30, 2012, Mar. 20, 2012 (Mar. 20, 2012), XP050599917, [retrieved on Mar. 20, 2012], section 3.1 PSS/SSS and PBCH/MIB.

Sayan et al. U.S. Appl. No. 61/615,097, filed Mar. 23, 2012 provisional application of U.S. Appl. No. 13/837,350.

ZTE Corporation, "TP for evaluation/analysis of reduction of maximum bandwidth," [online], 3GPP TSG-RAN WG1#68 R1-120290, Jan. 31, 2012, 4 pages. Retrieved from the internet—URL:http://www.3gpp.org/ftp/tsg_ran/WG 1_RL 1/TSGR1_68/Docs/R1-120290.zip.

InterDigital Communications, LLC: "Consideration on Search Space Design for ePDCCH in Rel-11 [online]", 3GPP TSG-RAN WG1#68b R1-121318, URL:http://www.3gpp.org/ftp/tsg_ran/WG1_RL1/TSGR1_68b/Docs/R1-121318.zip, Mar. 30, 2012, 4 pages.

New Postcom: "Evaluation on Diversity Schemes for E-PDCCH [online]", 3GPP TSG-RAN WG1#68b R1-121123, URL:http://www.3gpp.org/ftp/tsg_ran/WG1_RL1/TSGR1_68b/Docs/R1-121123.zip, Mar. 30, 2012, 4 pages.

St-Ericsson et al., "Extending PBCH Test Coverage, 4Tx [online]", 3GPP TSG-RAN WG5 #54 R5-120505, URL:http://www.3gpp.org/ftp/tsg_ran/WG5_Test_ex-T1/TSGR5_54_Dresden/Tdoc/R5-120505.zip, Feb. 10, 2012, 3 pages.

\* cited by examiner ically, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

METHODS AND APPARATUS FOR MANAGING MACHINE-TYPE COMMUNICATIONS

CROSS-REFERENCE TO RELATED APPLICATION(S)

This application is a continuation of U.S. application Ser. No. 13/844,176, entitled "Methods and Apparatus for Managing Machine-Type Communications" and filed on Mar. 15, 2013, which claims the benefit of U.S. Provisional Application Ser. No. 61/646,169, entitled "Methods and Apparatus for Managing Machine-Type Communications" and filed on May 11, 2012, and claims the benefit of U.S. Provisional Application Ser. No. 61/648,004, entitled "Methods and Apparatus for Managing Machine-Type Communications" and filed on May 16, 2012, which are expressly incorporated by reference herein in their entireties.

BACKGROUND

Field

The present disclosure relates generally to communication systems, and more particularly, to methods and apparatus for managing machine-type communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one example, a method for providing machine-type-communication (MTC) in a wireless network is provided. The method includes allocating a narrow bandwidth within a wide system bandwidth for communicating data related to MTC and generating MTC control data for communicating over one or more MTC control channels for an MTC user equipment (UE) within the narrow bandwidth. The method further includes transmitting the one or more MTC control channels multiplexed with one or more legacy channels over the wide system bandwidth.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 13 is a flow chart of a method of wireless communication.

DETAILED DESCRIPTION

Figure 1:
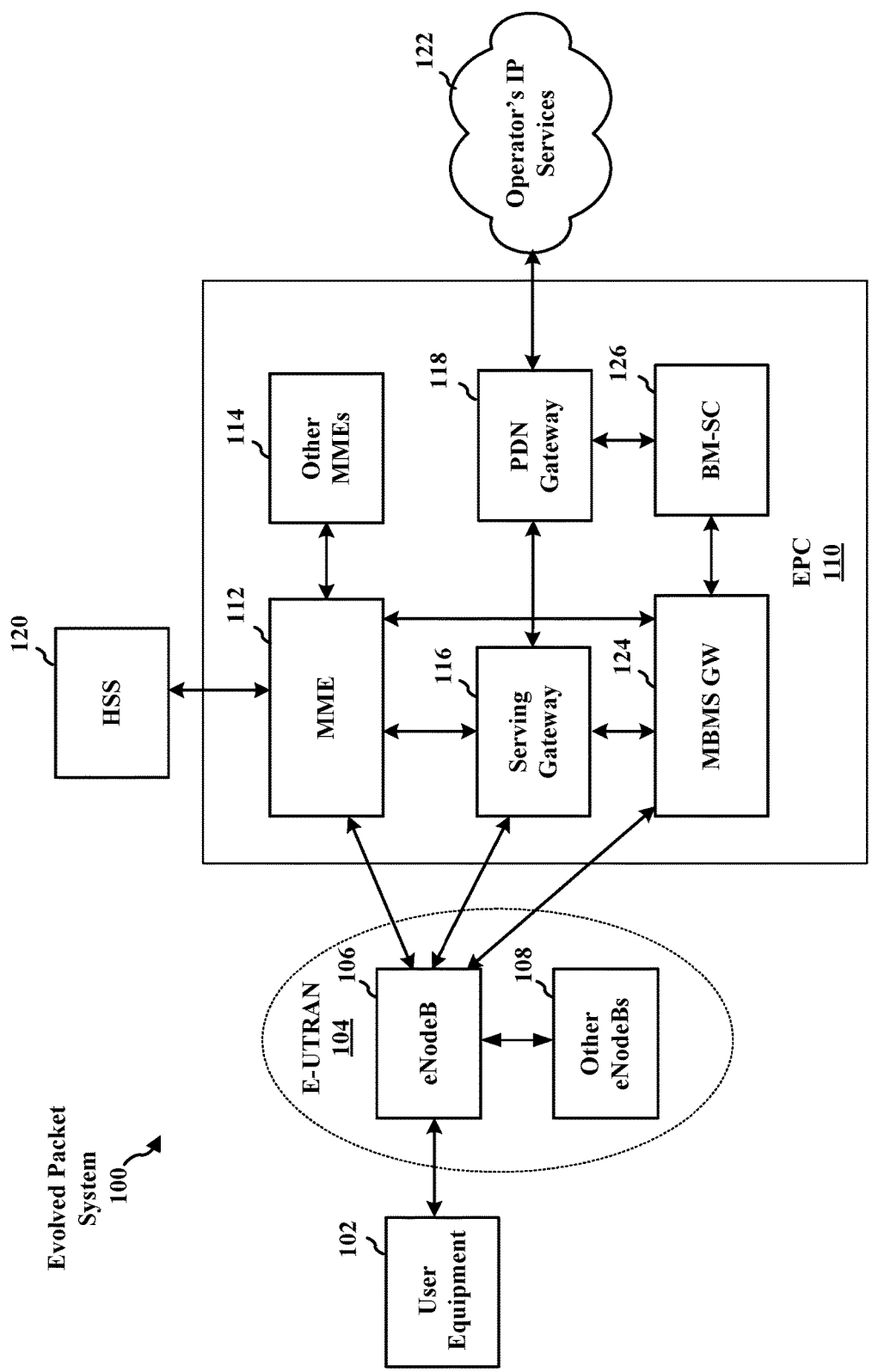
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
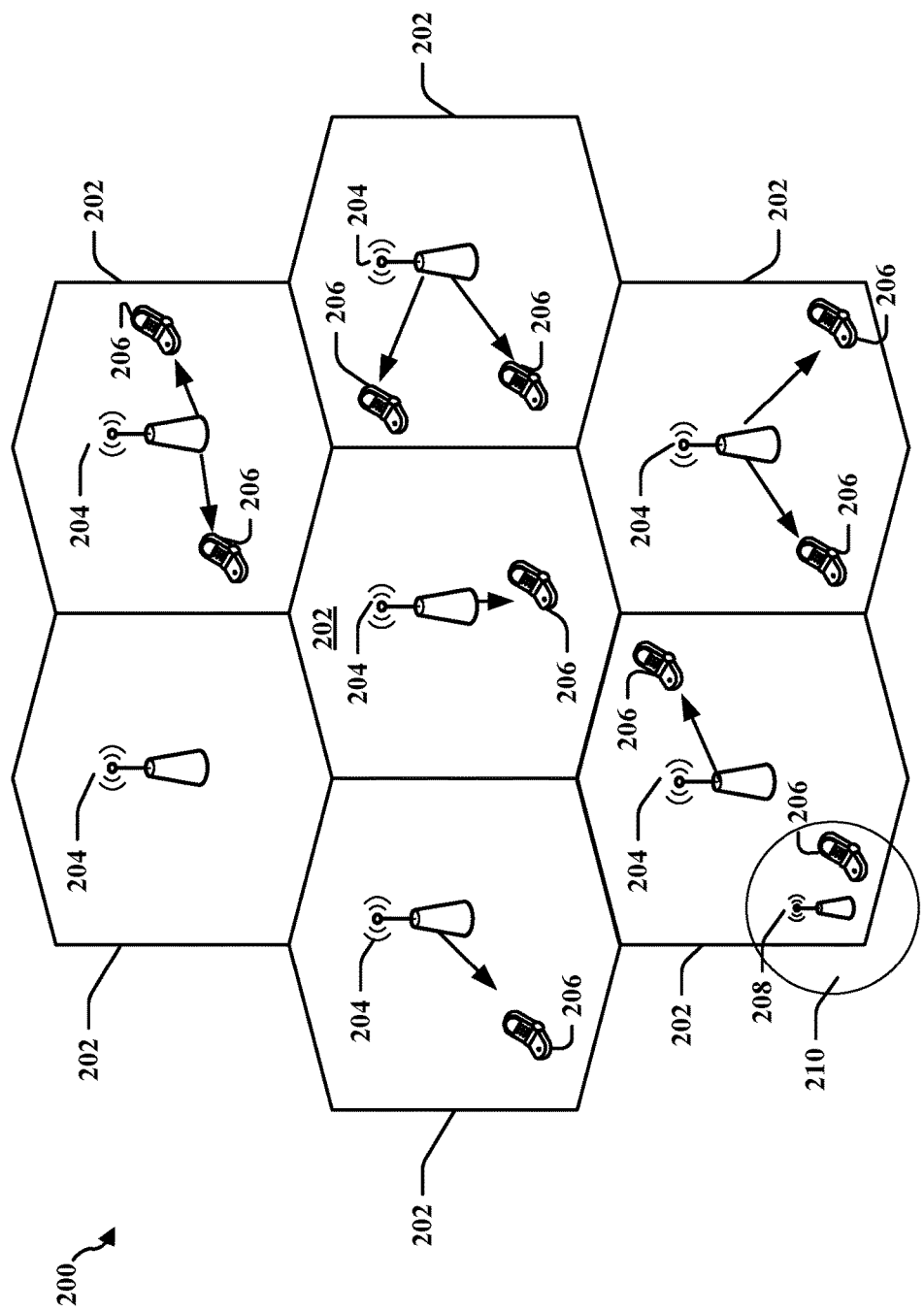
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sector). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
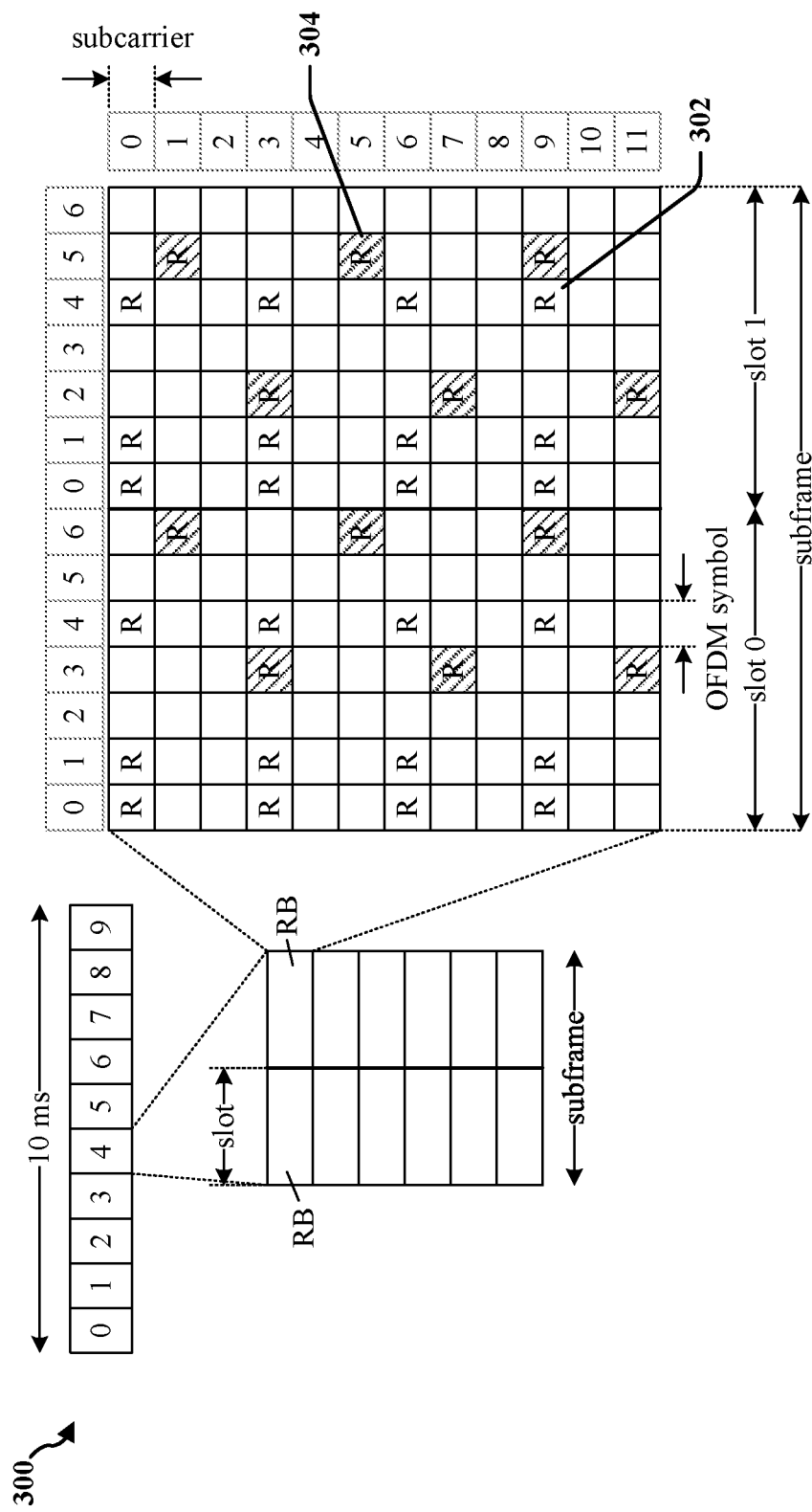
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
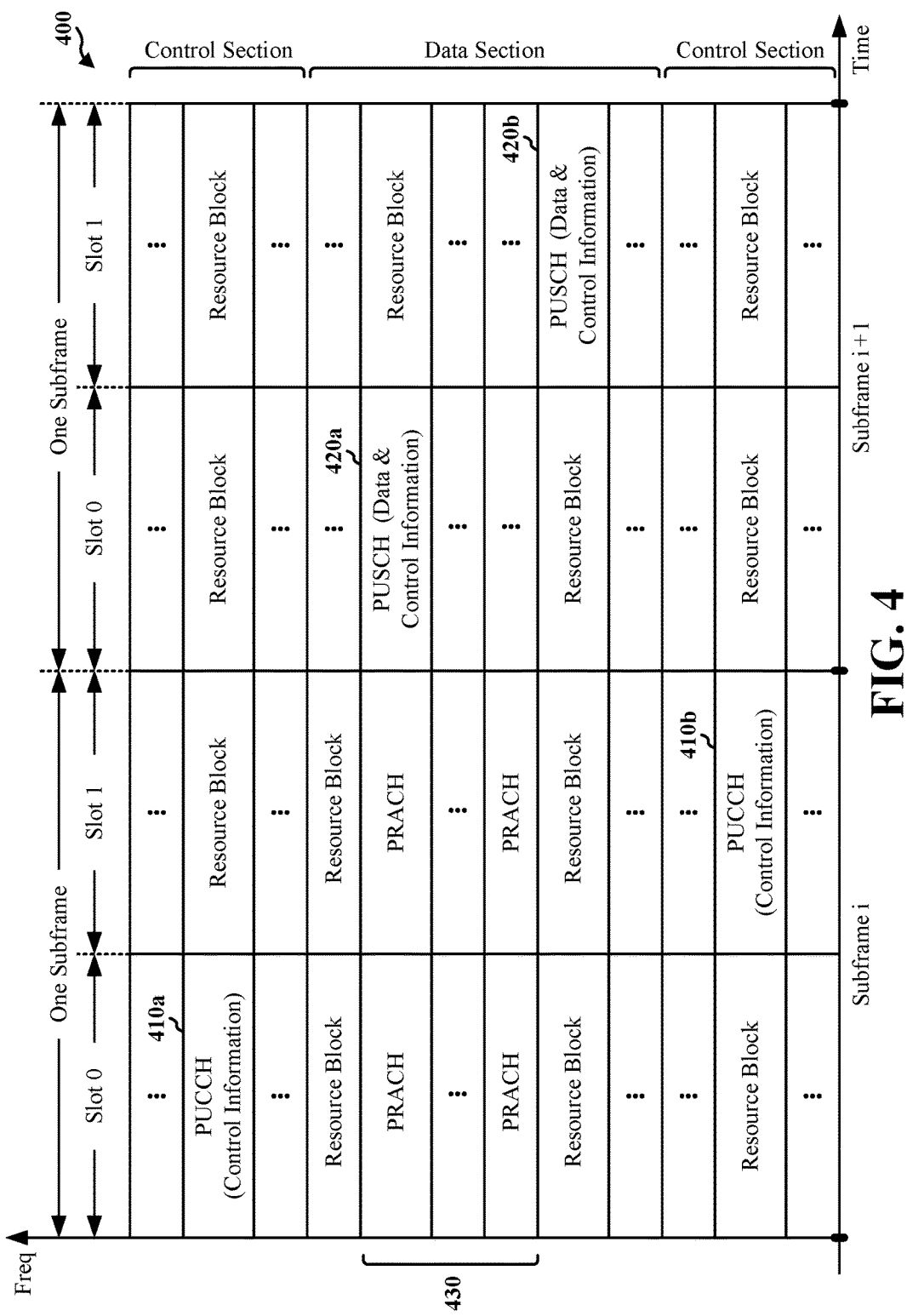
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
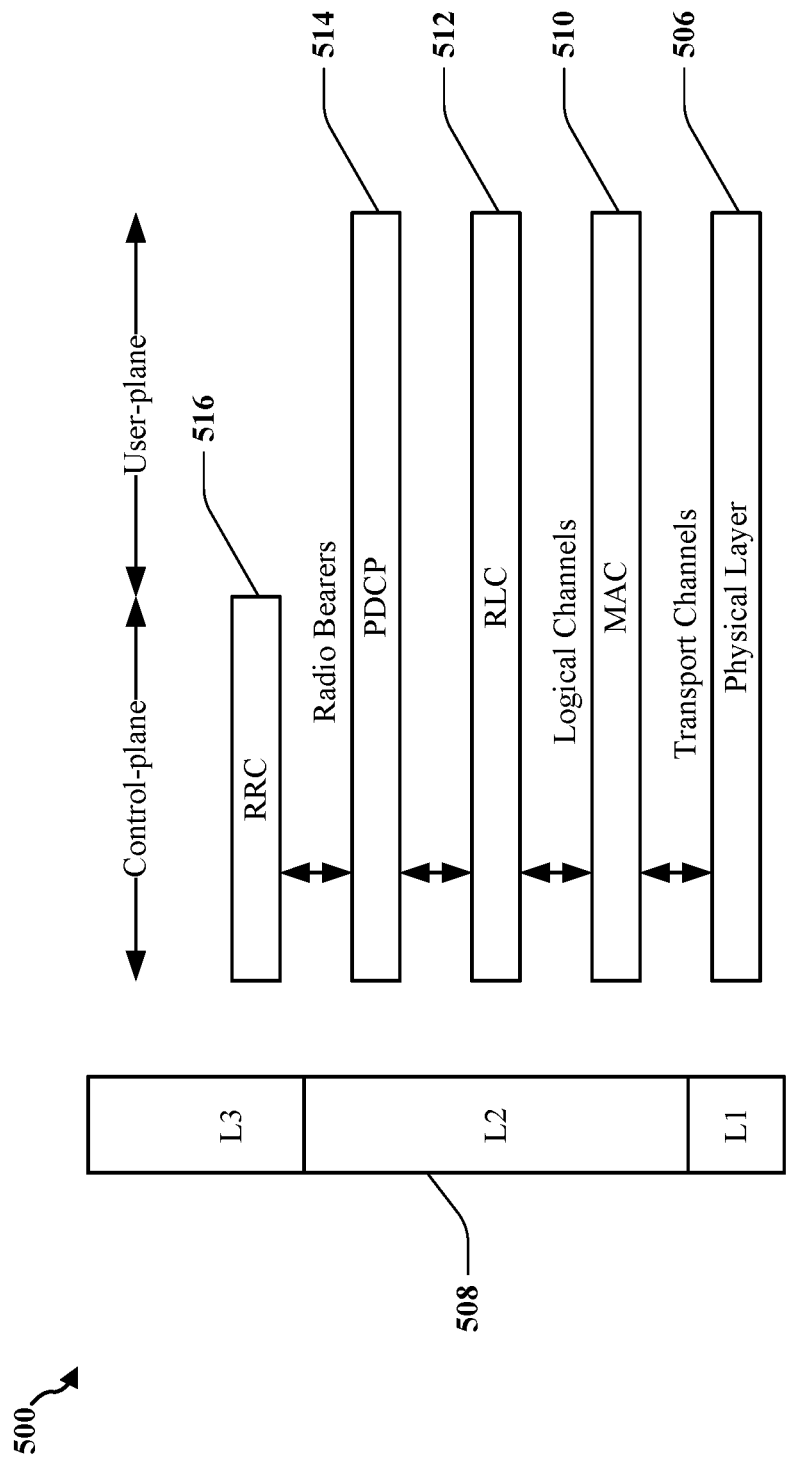
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
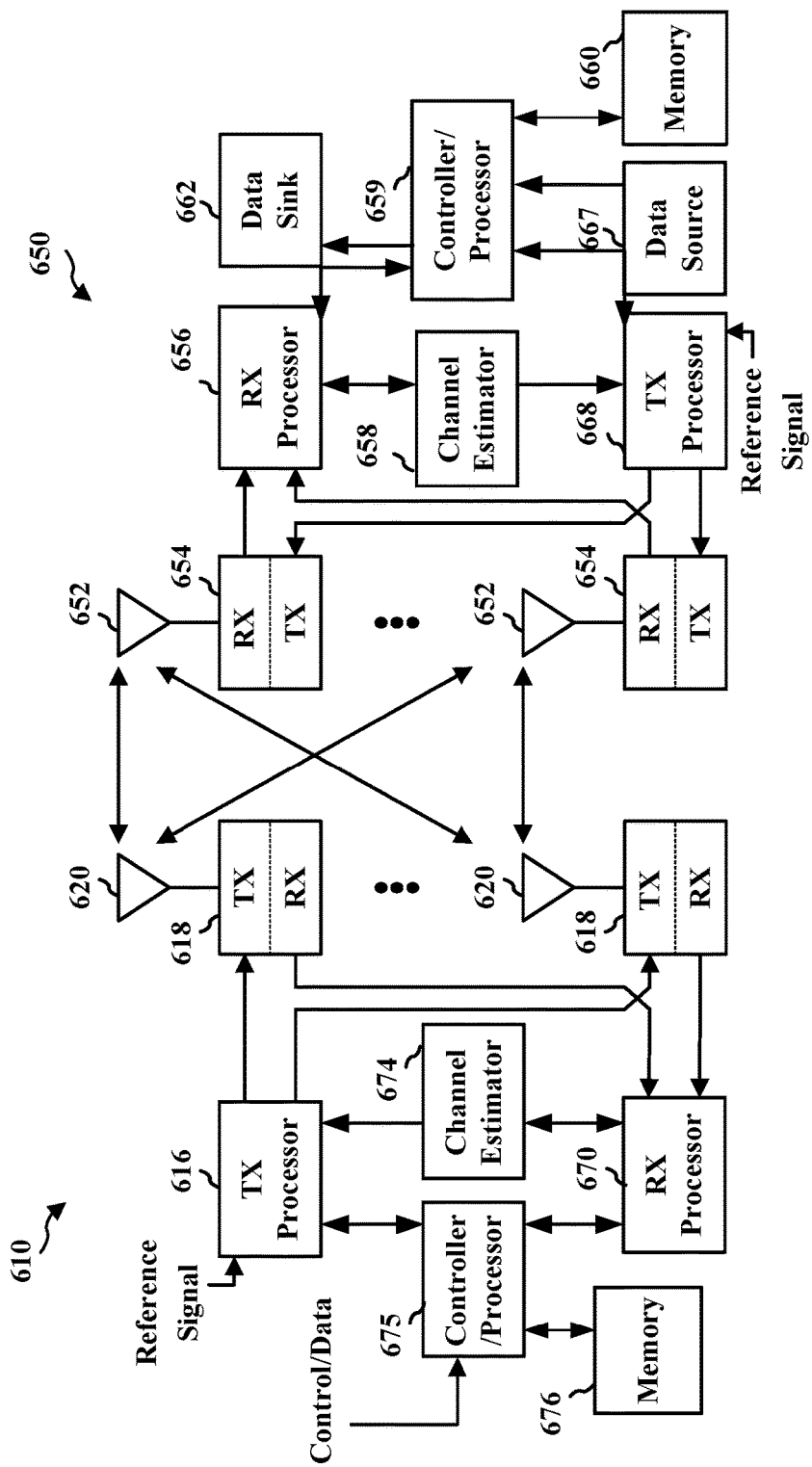
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Described herein are various aspects related to providing support for machine-type communications (MTC) in a wireless network. Due to reduction in requirements for such communications and related MTC UEs, such MTC UEs can be supported within a fraction of a wide bandwidth used for current wireless technologies. For example, MTC UEs can operate using a reduced bandwidth, single radio frequency (RF) chain, reduced peak rate, reduced transmit power, half duplex operation, etc., at least because related capabilities of such MTC UEs are less than those of more complex UEs (e.g., smart phones, tablets, etc.). For example, a data rate of an MTC UE is not expected to exceed 100 kilobits per second (kbps) and, therefore, such MTC UEs can be supported with reduced network requirements. Moreover, a portion of transmission modes in such technologies can be supported for MTC UE communication, and/or additional modes can be defined to lessen network complexity, as described herein.

Traditional LTE designs are generally focused on improving spectral efficiency, ubiquitous coverage, and enhanced QoS support, for example. Such improvements generally serve high end devices, such as the state-of-art smartphones, tablets, etc. However, low cost and low data rate devices, such as MTC UEs, need to be supported as well. For example, it has been shown that the number of such low cost devices being used may exceed today's complex cell phones. Accordingly, in order to support such MTC UEs in an LTE system, improvements such as the reduction of maximum bandwidth, a single receive RF chain, a reduction of peak rate, a reduction of transmit power, and half duplex operation may be needed.

Since the intended data rate for low cost devices is typically less than 100 kilobits per second (kbps), it is possible to operate such low cost devices only at narrow bandwidths to reduce costs. For example, two operation scenarios may be possible. In one scenario, some narrow bandwidth, e.g. 1.25 megahertz (MHz), may be reserved to support MTC operations. Standard changes may not be necessary for such operations. In another scenario, low cost UEs may be operated in a large bandwidth. In such a scenario, low cost UEs, such as MTC UEs, may co-exist with regular non-MTC UEs, such as smartphones and tablets. In this scenario, for example, two possible operations for low cost UEs in a large bandwidth are possible. In a first operation, low cost UEs still operate at the same large bandwidth (e.g., e.g., up to 20 MHz). Such a first operation may not impact the LTE standards, however, may not help in reducing cost and battery power consumption. In a second operation, low cost UEs may operate with a smaller bandwidth (e.g., 1.25 MHz), however, the performance of the low cost UEs may be impacted.

Figure 7:
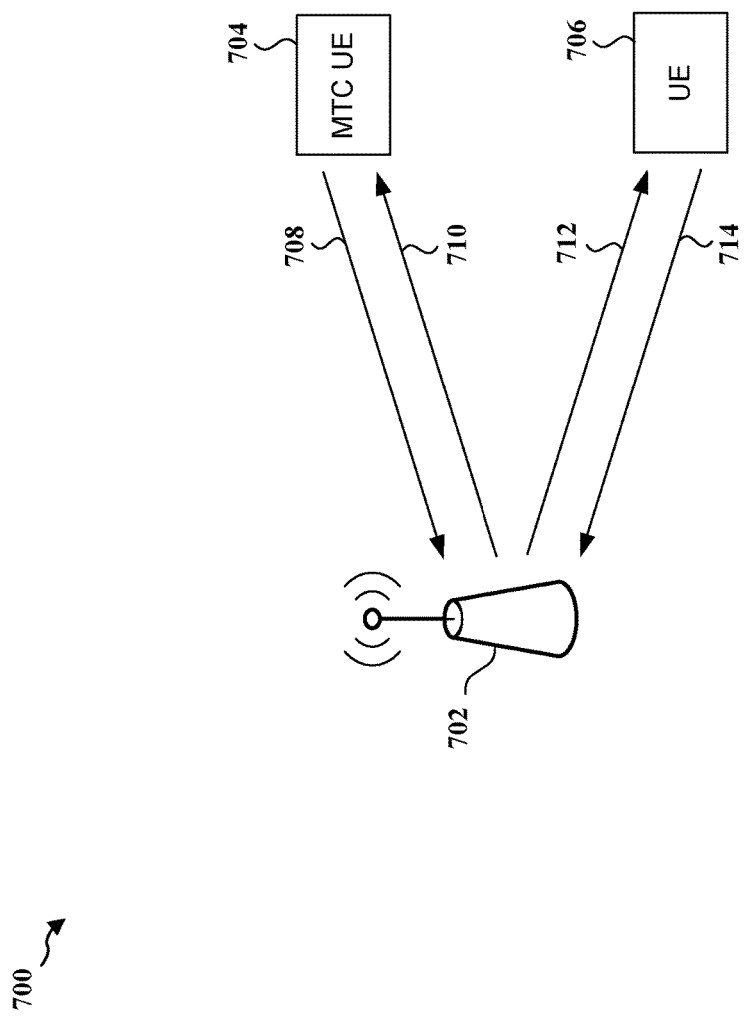
FIG. 7 is a diagram illustrating a communication system.

FIG. 7 is a diagram 700 illustrating a communication system. FIG. 7 includes a node 702, an MTC UE 704, and a UE 706 (also referred to as a "non-MTC UE"). The node 702 can be a macro node (e.g., an eNB), femto node, pico node, or similar base station, a mobile base station, a relay, a UE (e.g., communicating in peer-to-peer or ad-hoc mode with another UE), a portion thereof, and/or substantially any component that communicates control data in a wireless network. The MTC UE 704 and non-MTC UE 314 can each be a mobile terminal, a stationary terminal, a modem (or other tethered device), a portion thereof, and/or substantially any device that receives control data in a wireless network.

As shown in FIG. 7, the MTC UE 704 receives DL transmissions 710 from eNB 702 and sends UL transmissions 708 to the eNB 702. In one aspect, the DL and UL transmissions 710 and 708 may include either MTC control information or MTC data. As further shown in FIG. 7, the UE 706 receives DL transmissions 712 from eNB 702 and sends UL transmissions 714 to the eNB 702.

Figure 8:
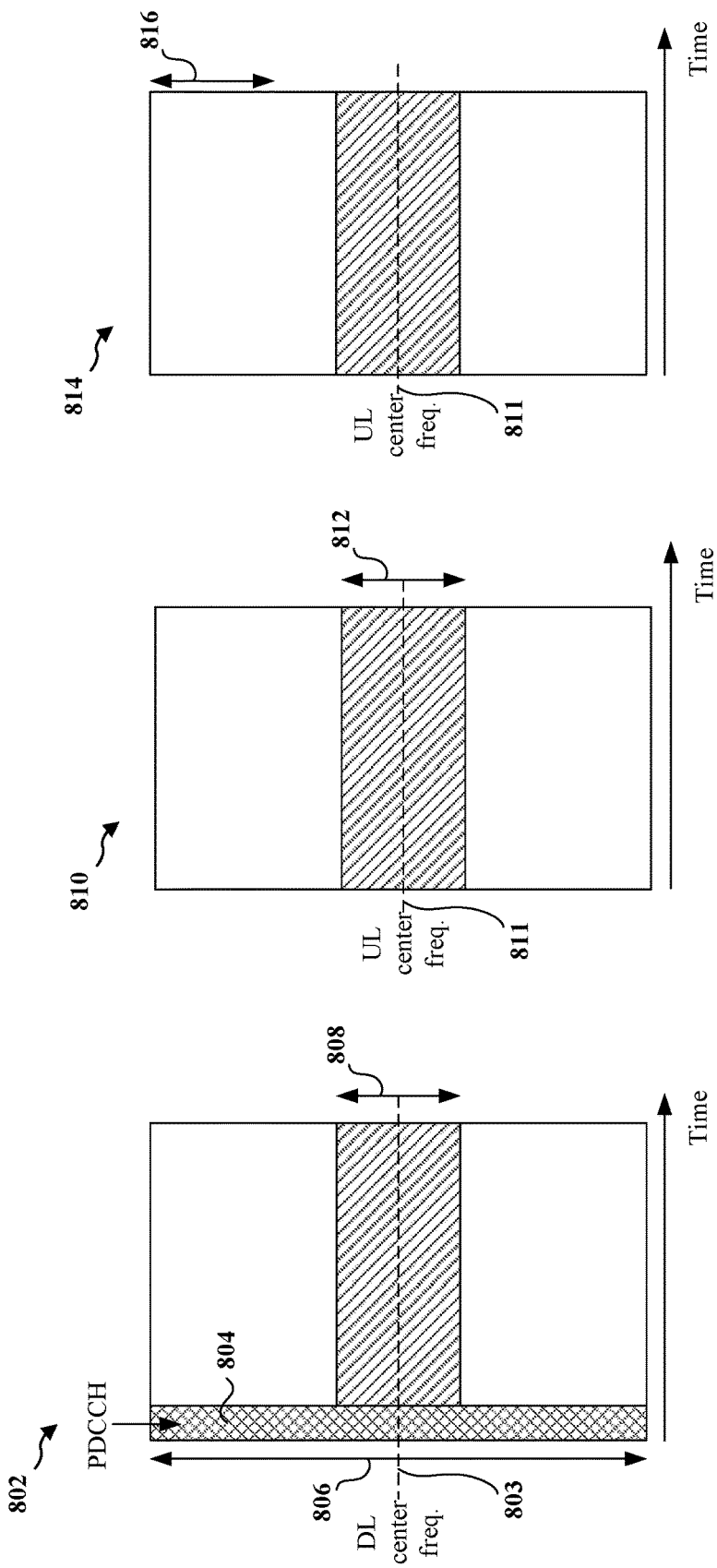
FIGS. 8A through 8C are diagrams illustrating narrowband operation of MTC UEs in a large bandwidth allocated for non-MTC UEs.

FIGS. 8A through 8C are diagrams 802, 810, and 814 illustrating narrowband operation of MTC UEs in a large bandwidth allocated for non-MTC UEs. FIG. 8A shows a large bandwidth 806 allocated for non-MTC UEs and further shows a DL center frequency 803. Accordingly, the DL operates in the center of the large bandwidth 806. In the configuration of FIG. 8A, shaded portion 804 is reserved for PDCCH. As further shown in FIG. 8A, narrow bandwidth 808 can be used for both UL and DL and can be used for a primary synchronization signal (PSS), secondary synchronization signal (SSS), physical broadcast channel (PBCH), SIB, and/or paging. For example, the narrow bandwidth can be 1.25 MHZ. FIG. 8B shows a UL center frequency 811 and the narrow bandwidth 812. For example, UL random access channel (RACH) messages (e.g., message 1 and message 3) can be communicated by MTC UEs in the UL center frequency 811 to facilitate access to the network. As shown in FIG. 8C, other UL transmissions can be communicated in a bandwidth different from narrow bandwidth 808, such as bandwidth 816. It should be understood that in FIGS. 8A through 8C, the small bandwidth 808 can be located in a region other than the center of the large bandwidth 806.

In a specific example, LTE allows the following transmission modes (TMs): TM1 for single antenna port, TM2 for transmit diversity, TM3 for open loop MIMO, TM4 for close loop MIMO, TM5 for multi-user MIMO, TM6 for single layer closed loop MIMO, TM7 for single layer beamforming with dedicated reference signal (RS), TM8 for dual layer beamforming with dedicated RS, TM9 for MIMO with up to 8 layer transmissions, and TM10 for coordinated multiple point (CoMP). For SIB/MIB transmission, as well as message 2 and message 4 for RACH, the default transmission modes are used: TM1 is used for single and TM2 is used for 2 transmit (Tx) antennas or 4 Tx antennas. The UE can be switched to another transmission mode based on UE specific radio resource control (RRC) signaling.

MIB or physical broadcast channel (PBCH) can contain various information bits, such as bandwidth information bits, physical HARQ indicator channel (PHICH) configuration bits, and SFN bits. The bandwidth information can be four bits, however, such bandwidth information may not be needed for MTC when narrowband operation is used. The PHICH configuration bits can be three bits (e.g., one bit for duration, two bits for PHICH group). However, such PHICH configuration may not be needed if NCT is used or if a fixed control region for PBCH subframe is used. The SFN bits can be eight bits of the most significant bits (MSB) (the other 2 bit from blind decoding of PBCH in 40 ms). The SFN bits can be signaled later in the payload. Antenna information can be conveyed by another signal. PBCH transmission matches around 4 antenna ports, space frequency block code (SFBC) or SFBC-frequency switched transmit diversity (FSTD) is used for antenna numbers of 2 or 4. Combined with 4 timing hypothesis and 3 antenna hypothesis, a total of 12 blind decoding is needed for current PBCH decoding.

Therefore, in order to reduce costs, MTC can be operated in a narrow band, e.g. six resource blocks (RBs). Considering cost saving as well as limited requirement on the data rate, the transmission mode can be restricted only to those without the support of spatial multiplexing.

Figure 9:
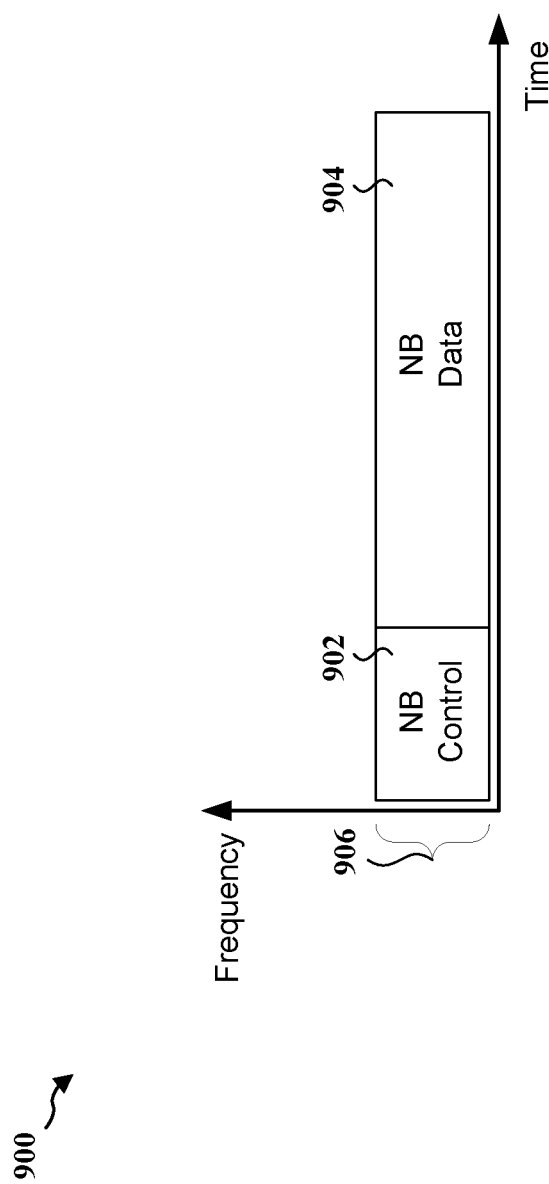
FIG. 9 is a diagram illustrating an MTC downlink bandwidth allocation.

FIG. 9 is a diagram 900 illustrating an MTC downlink bandwidth allocation. The MTC bandwidth 906 can be a narrow bandwidth (also referred to as "narrowband" (NB)) allocated to MTC devices, such as the MTC UE 704, as compared to a wide system bandwidth (WB) allocated to other UEs (e.g., non-MTC UEs) in a wireless network, such as the UE 706. In one example, as shown in FIG. 9, the bandwidth 906 for MTC can be allocated as a standalone bandwidth. For example, the bandwidth 906 can be that available in a corresponding wireless network (e.g., 5 MHz, 1.4 MHz, etc. in LTE). In the example of FIG. 9, downlink control channels 902 can be reserved on the first four symbols of the bandwidth 906 and downlink data channels 904 can be reserved on subsequent symbols of the bandwidth 906. For example, the symbols can correspond to OFDM symbols where bandwidth is partitioned to yield a number of subcarriers in the frequency domain over a number of symbols in the time domain. In other examples, described hereinbelow, the symbols can correlate to time periods in TDM, frequencies in FDM, and/or the like. In any case, the bandwidth allocations discussed herein may correlate to a subframe or other time period in the wireless network.

Figures 10A, 10B:
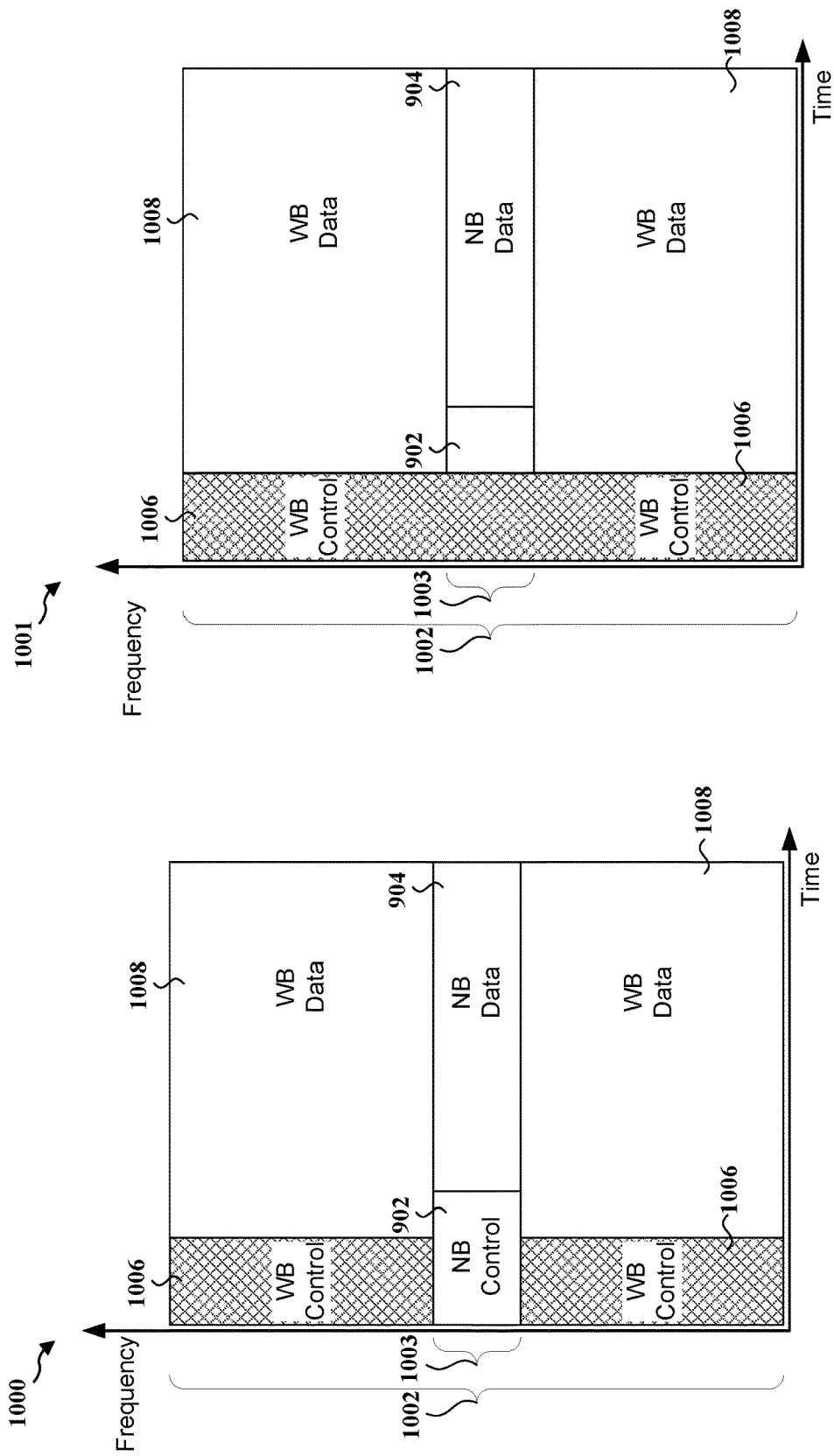
FIGS. 10A and 10B are diagrams illustrating bandwidth allocations for MTC.

FIG. 10A is a diagram 1000 illustrating an MTC downlink bandwidth allocation. In one example, as shown in FIG. 10A, the narrow bandwidth 1003 for MTC is multiplexed within a wide system bandwidth 1002 of a corresponding wireless network. For example, the narrow bandwidth 1003 can be 1.25 MHz within the wide system bandwidth 1002 of 20 MHz. The wide system bandwidth 1002 has a region 1006 reserved for legacy control channels of the wireless network related to the wide system bandwidth 1002, such as in LTE. The wide system bandwidth 1002 also has a region 1008 reserved for legacy data channels. The term legacy is used herein to describe a current technology used by the wireless network within which MTC support is implemented, for example. Where the legacy control channels 1006 and MTC control channels 902 collide, various scenarios are possible. In one scenario, as shown in FIG. 10A, the legacy control channels 1006 can be punctured with the control channels 902 for MTC to ensure that communication of the MTC control channels takes precedence over the legacy control channels 1006. In another scenario, as shown in diagram 1001 of FIG. 10B, the control channels 902 for MTC can be punctured with the legacy control channels 1006 to ensure that communication of the legacy control channels 1006 takes precedence over the MTC control channels 902. In such a scenario, the control region 902 for MTC can be fixed and, therefore, there may be no need for a primary control format indicator channel (PCFICH). Moreover, PDCCH can be used for UL retransmission and, therefore, there may be no need for PHICH. In other possible scenarios: neither channels 1006 nor 902 are punctured such that UE implementation is relied upon to resolve conflicts (e.g., interference cancelation); power can be different for the legacy control channels 1106 and MTC control channels 902, and can be adjusted either semi-statically, dynamically, etc. according to respective priorities; legacy control channels 1006 and MTC control channels can be operated as two systems, where one can be barred based on bandwidth capability, carrier capability, MTC capability, or other capabilities; etc. Other scenarios are possible; the foregoing list are examples of such scenarios. In any case, it is to be appreciated that other data of the wireless network related to the wide system bandwidth can be scheduled around MTC data and/or control channels outside of the legacy control channel region 1006.

Figure 11:
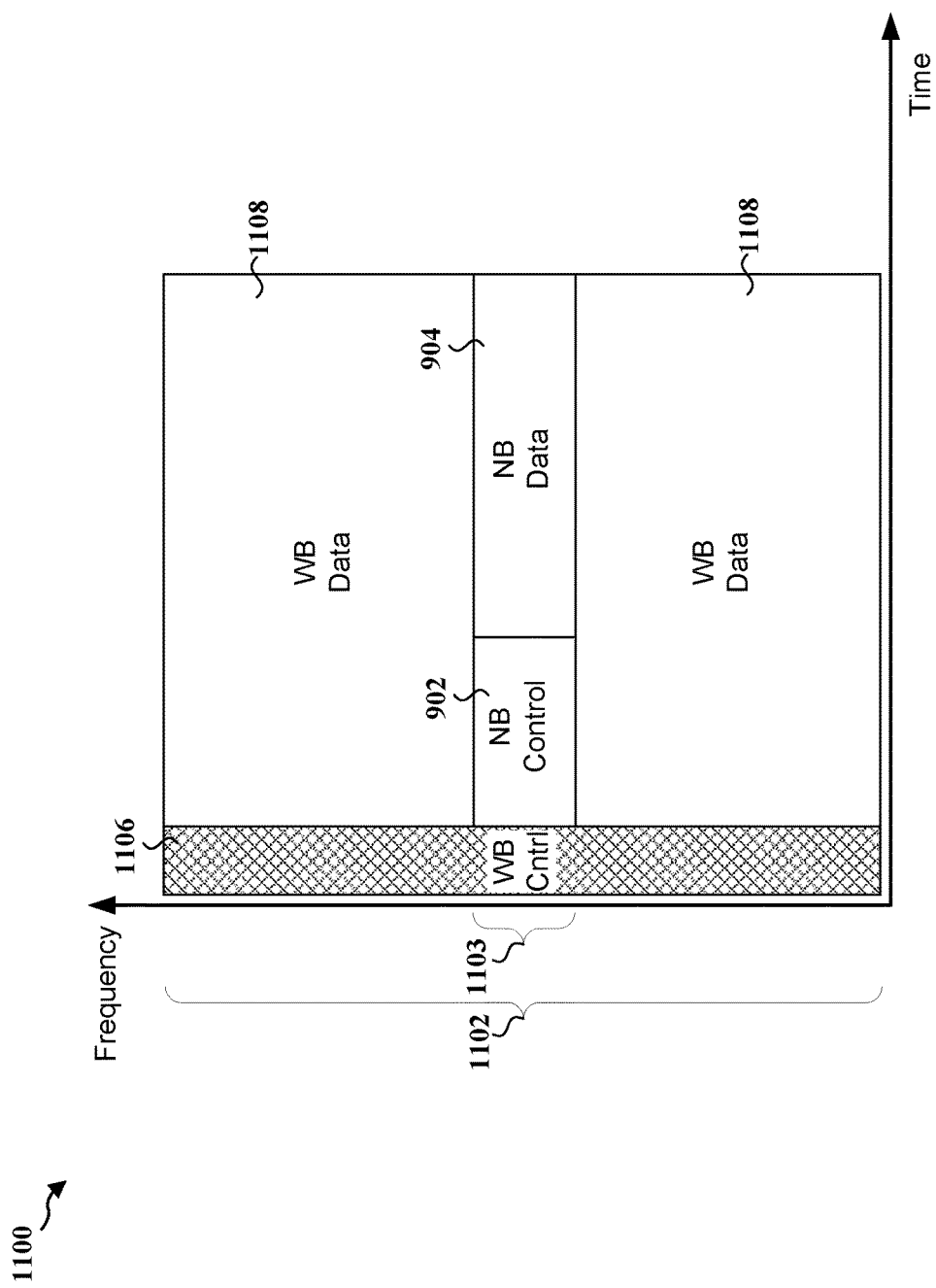
FIG. 11 is a diagram illustrating an MTC downlink bandwidth allocation.

FIG. 11 is a diagram 1100 illustrating an MTC downlink bandwidth allocation. In one example, as shown in FIG. 11, the narrow bandwidth 1103 for MTC is multiplexed within a wide system bandwidth 1102 of a corresponding wireless network. For example, the narrow bandwidth 1103 can be 1.25 MHz within the wide system bandwidth 1102 of 20 MHz. The wide system bandwidth 1102 has a region 1106 reserved for legacy control channels of the wireless network related to the wide system bandwidth 1102, such as in LTE. The wide system bandwidth 1102 also has a region 1108 reserved for legacy data channels. As shown in FIG. 11, neither channels 1106 nor 902 are punctured such that UE implementation is relied upon to resolve conflicts (e.g., interference cancelation).

With reference to FIG. 11, the narrow bandwidth 1103 for MTC can be allocated outside of the legacy control region 1106 to avoid interfering with the legacy control region 1106. Other data communications in the wireless network related to the wide system bandwidth 1102 can be scheduled around the narrow bandwidth 1103 for MTC. For example, in LTE, the control region 1106 can occupy zero to three symbols. In one example, to accommodate MTC control data 902, the control region 1106 in a subframe where MTC data 904 is transmitted can be limited (e.g., to one data symbol), and MTC data 904 can start from the next (e.g., the second) symbol. In another example, the control region 1106 in a subframe where MTC data 904 is transmitted can be limited to two data symbols, and MTC data 904 can start from the next (e.g., the third) symbol. It is to be appreciated that only certain subframes can be utilized for transmitting MTC in this regard, and the subframes can be determined based on a number of served MTC UEs (e.g., as compared to a number of served non-MTC UEs). FIGS. 10A, 10B, 11, and 12 each show one example MTC allocation. However, it should be understood that multiple MTC allocations may be possible in a given subframe in addition to the example allocations shown in FIGS. 10A, 10B, 11, and 12.

Figure 12:
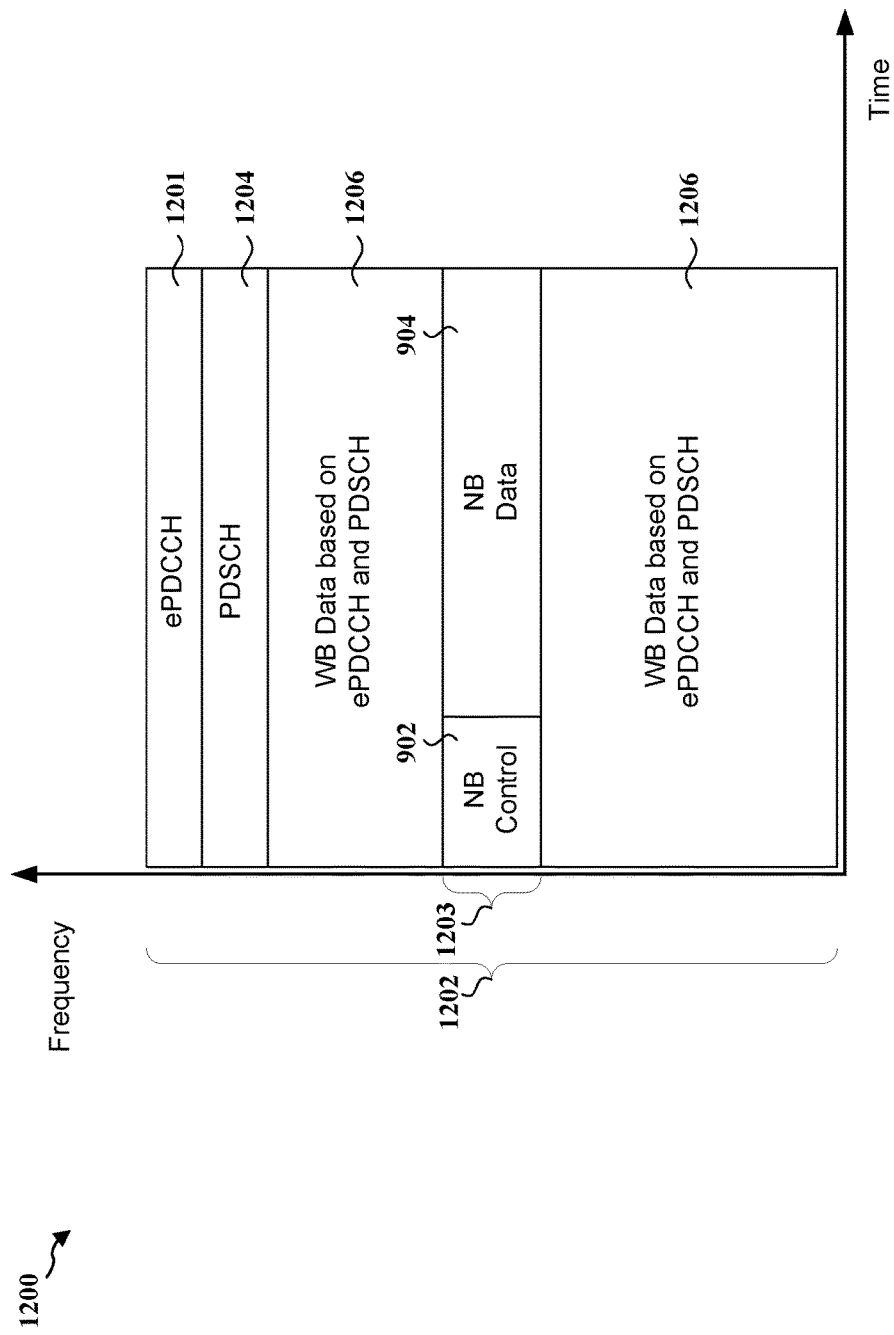
FIG. 12 is a diagram illustrating an MTC downlink bandwidth allocation.

FIG. 12 is a diagram 1200 illustrating an MTC downlink bandwidth allocation. FIG. 12 includes evolved physical downlink control channel (ePDCCH) 1201, PDSCH 1204 and legacy data channel 1206. In one example, as shown in FIG. 12, the narrow bandwidth 1203 for MTC is multiplexed within the wide system bandwidth 1202 where the wide system bandwidth 1202 does not have a control region that spans the entire frequency band. For example, as described further herein, new carrier types (NCTs) may be developed that define a downlink control region over a portion of the frequency band, such as ePDCCH 1201. Thus, MTC communications 902 and 904 can be scheduled within a legacy data region 1206 of the wide system bandwidth 1202 so as not to interfere with legacy NCT control channel communications.

Figure 13:
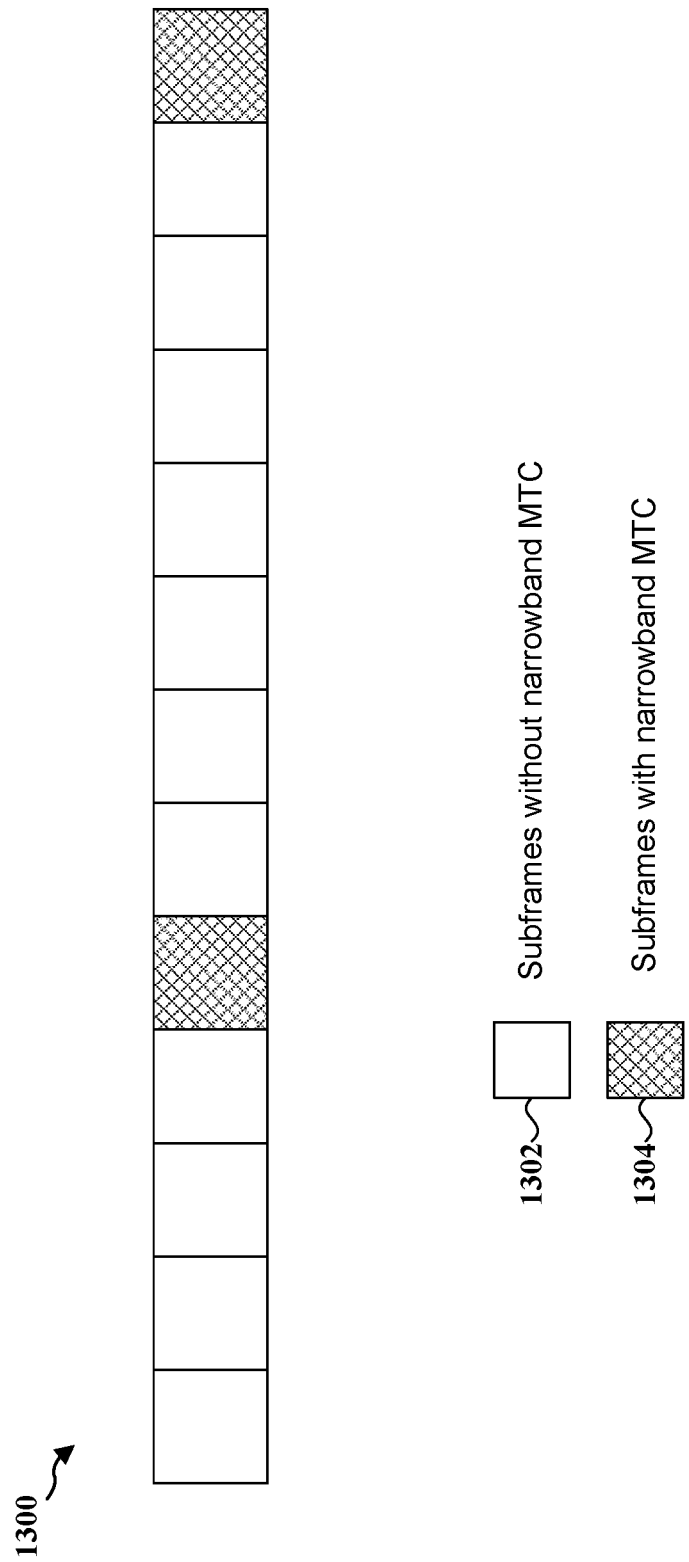
FIG. 13 is a diagram illustrating subframes without narrowband MTC and subframes with narrowband MTC.
Figure 14:
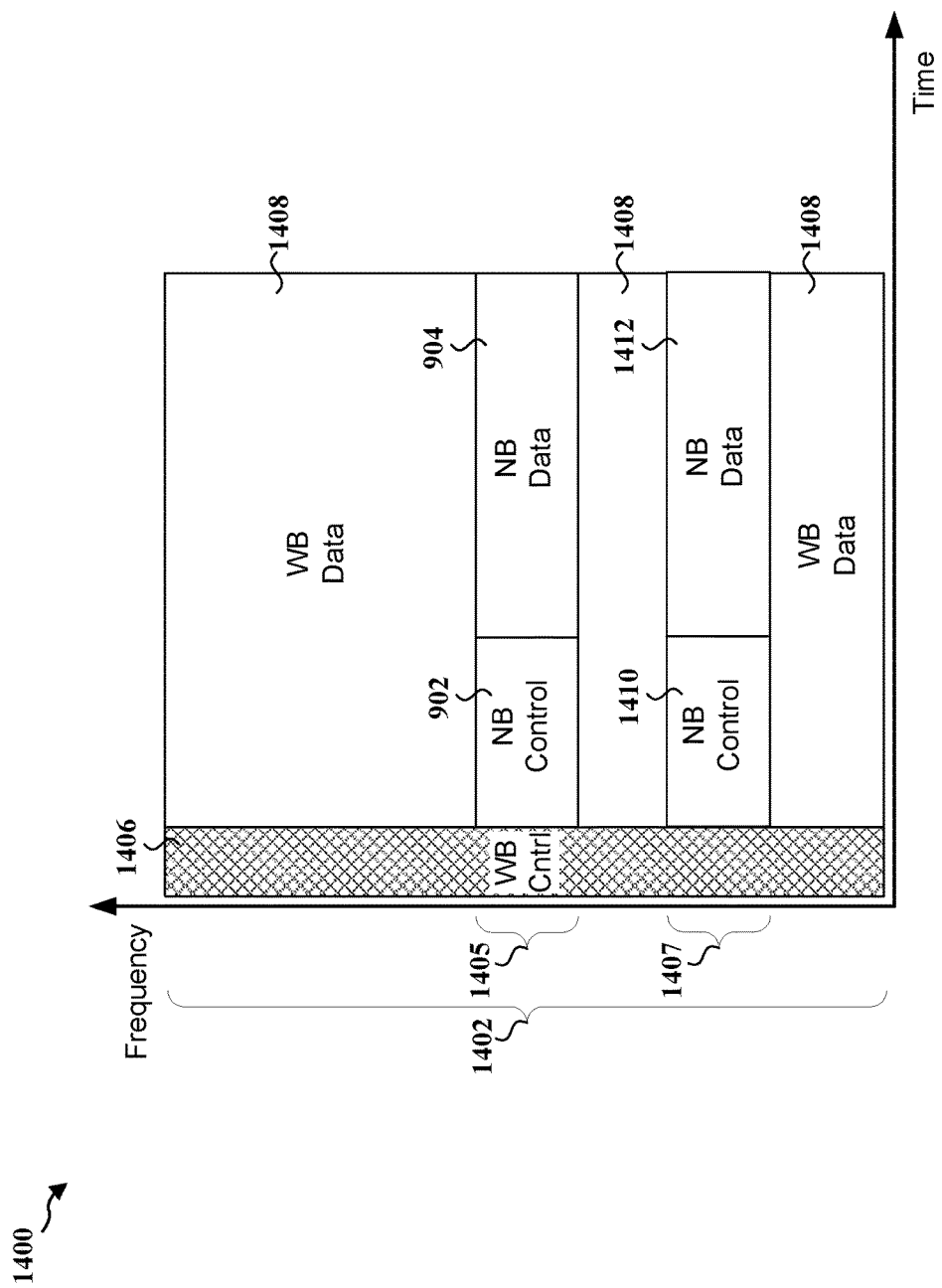
FIG. 14 is a diagram illustrating an MTC downlink bandwidth allocation.

A TDM partition of MTC users with other users will now be discussed. For example, FIG. 13 is a diagram 1300 illustrating subframes 1302 without narrowband MTC and subframes 1304 with narrowband MTC. As shown in FIG. 13, wideband operation only needs to have some subframes allocated to MTC depending on loading. Other subframes may have an adaptive control region. In FIG. 13, subframes 1302 may have any adaptive control region length while subframes 1304 can have fixed control channel length to one or two, or RRC signaled to MTC. The subframes with MTC may have either a fixed control region of one or two, or can change semi-statically by RRC or SIB signaling to MTC. In one example, if CRS is used for MTC, then MBSFN should not be used for the subframes allocated for MTC devices An FDM partition of MTC users within a subframe (SF) will now be discussed. In one aspect, multiple narrowband for MTC can be allocated within the subframe where MTC users are allowed as shown in FIG. 14. FIG. 14 is a diagram 1400 illustrating an MTC downlink bandwidth allocation. In FIG. 14, the narrow bandwidths 1405 and 1407 for MTC are multiplexed within a wide system bandwidth 1402 of a corresponding wireless network. For example, the narrow bandwidths 1405 and 1407 can each be 1.25 MHz within the wide system bandwidth 1402 of 20 MHz. As shown in the configuration of FIG. 14, the narrow bandwidth 1405 includes narrowband control channels 902 and narrowband data channels 904 for MTC. As further shown in FIG. 14, the narrow bandwidth 1407 includes narrowband control channels 1410 and narrowband data channels 1412 for MTC. The wide system bandwidth 1402 includes a region 1406 reserved for legacy control channels of the wireless network related to the wide system bandwidth 1402, such as in LTE. The wide system bandwidth 1402 also includes a region 1408 reserved for legacy data channels.

Figure 15:
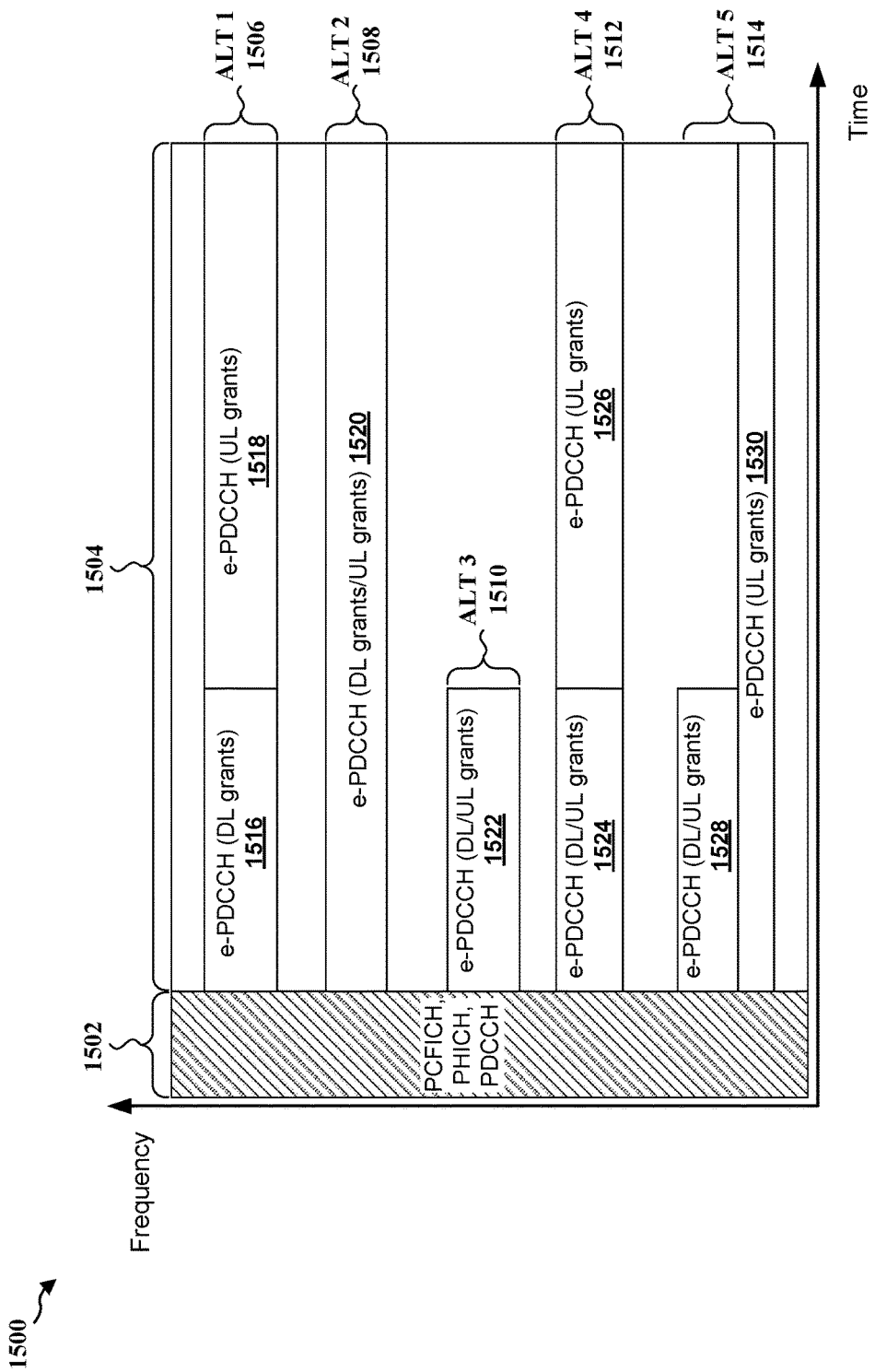
FIG. 15 is a diagram illustrating various example ePDCCH structures associated with an NCT.

FIG. 15 is a diagram 1500 illustrating various example ePDCCH structures associated with an NCT. The ePDCCH structures shown in FIG. 15 are depicted in an example portion of time over a portion of frequency, which may be a subframe. For example, a portion of initial resources in the subframe can be reserved for a legacy control region 1502 for communicating control data to legacy devices, which can include PDCCH, PCFICH, PHICH, and/or similar channels. In LTE, the legacy control region 1502 can be a number of OFDM symbols, n, in the subframe where n can be an integer between one and three. It is to be appreciated that where ePDCCH is defined for an NCT, the legacy control region 1502 may not be present (as previously discussed with reference to FIGS. 10A and 10B). In any case, the remaining resources can include a data region 1504 of the subframe. Thus, unlike legacy PDCCH, ePDCCH for an NCT can occupy only the data region 1504.

In FIG. 15, five alternatives are depicted for defining an enhanced control channel structure, though it is to be appreciated that other alternatives are possible. For example, an enhanced control channel structure can support increased control channel capacity, support frequency domain inter-cell interference coordination (ICIC), achieve improved spatial reuse of control channel resources, support beamforming and/or diversity, operate on a new carrier type and in MBSFN subframes, coexist on the same carrier as legacy devices, etc.

In alternative 1 1506, the enhanced control channel structure can be similar to relay-PDCCH (R-PDCCH), such that downlink grants are assigned over the control channel in at least a portion of frequency over a first portion 1516 of region 1504, and uplink grants are assigned over the control channel in the portion of frequency over a second portion 1518 of the region 1504. In alternative 2 1508, the enhanced control channel structure allows downlink and uplink grants to be assigned in a portion of frequency over a portion 1520 of the region 1504 spanning both the first and the second slots. In alternative 3 1510, the enhanced control channel structure allows downlink and uplink grants to be assigned over a portion of frequency using TDM in at least a portion 1522 of region 1504. In alternative 4 1512, the enhanced control channel structure allows downlink and uplink grants to be assigned over the control channel in at least a portion of frequency over a first portion 1524 of region 1504, and uplink grants are assigned over the control channel in the portion of frequency over a second portion 1526 of the region 1504. In alternative 5 1514, downlink grants can be assigned using TDM over at least a portion 1528 of region 1504, while uplink grants can be assigned using FDM in a different portion of frequency over a portion 1530 in the region 1504.

Using one or more of the alternatives, it is to be appreciated that an enhanced control channel can allow assignment of resources using various multiplexing schemes for downlink and/or uplink assignments as compared to conventional legacy control channel structures.

In one aspect, with reference to FIG. 7, the eNB 702 can select a single one of the previously discussed transmission modes for transmitting all MTC. For example, the eNB 702 can determine to use TM2 with transmit diversity for transmitting all MTC data. In another example, the eNB 702 can select TM9 with beamforming and demodulation reference signal (DM-RS)-based demodulation for the MTC data. In this example, the eNB 702 can transmit physical broadcast channel (PBCH), SIB, and PDSCH communications using TM9, along with a DM-RS for demodulating the communications. Moreover, in this example, the eNB 702 can transmit a defined RACH sequence to MTC UE 704 to utilize in requesting access over the RACH. In this example, MTC UE 704 can use the sequence, and the eNB 702 can accordingly select TM9 for the RACH procedure with MTC UE 704 based on receiving the defined sequence therefrom (e.g., in message 1 of the RACH procedure).

In another example, the eNB 702 can specify a new transmission mode (e.g., transmission mode 11) for communicating MTC. For example, this new transmission mode can utilize space frequency block code (SFBC) for transmitting master information block (MIB)/SIB and the RACH procedure, while using single layer beamforming for other transmissions in MTC. In this example, the eNB 702 can select this mode for MTC without switching, as described above with respect to TM2 or TM9. Moreover, the eNB 702 can use and advertise one downlink control information (DCI) format for MTC, which can be the same as DCI format 1a in LTE or a new DCI format.

In an aspect, the eNB 702 can generate a single reference signal (RS) for demodulating MTC data to reduce complexity of MTC implementation. For example, the RS can be a CRS. In one configuration, this can be combined with an SFBC TM, as previously described. Where CRS is used, however, the eNB 702 can refrain from using MBSFN. In another example, the RS can be a DM-RS, which can result in redesign of PBCH/SIB to support DM-RS. In addition, this can be combined with a TM9, described above.

The eNB 702 can create the MTC control data for transmitting over one or more logical MTC control channels. This can include generating one or more MIBs, SIBs, other PBCH communications, RACH messages, etc. In addition, because the MTC does not require as much information, as described, the generated MTC control data can utilize a different structure as other control data transmitted in the wireless network. For example, in LTE, an MIB typically includes bandwidth information, which may not be needed for MTC because the narrow bandwidth can be known by the eNB 702 and corresponding UEs, a PHICH, which may not be needed if a fixed control region is assumed for a PBCH structure, a system frame number (SFN) and antenna information, which can be signaled later, etc. Thus, the eNB 702 can generate a MIB without such information to conserve signaling, conserve processing, and reduce complexity at the MTC UE 704. Such a MIB with a portion of values used in the wireless network is referred to herein as a reduced MIB.

In another example, the eNB 702 can generate a combined MIB and SIB (e.g., the reduced MIB combined with SIB1) for communicating to the MTC UE 704. Moreover, for example, the eNB 702 can use a cyclic redundancy check (CRC) scrambling of the MIB or combined MIB/SIB to convey information left out of the reduced MIB, such as antenna information (e.g., based on mapping the scrambling code to corresponding antenna information). In yet another example, the eNB 702 can generate one or more SIBs that include a resource location (e.g., symbol and/or subcarrier in the symbol) and MCS for a next SIB to minimize control signaling.

In any case, for example, the eNB 702 can generate a MIB (e.g., reduced MIB), MIB/SIB combination, etc. with a demodulation reference signal (DM-RS) for demodulating the MIB, MIB/SIB, etc. In this regard, as described, the eNB 702 can transmit the MIB, MIB/SIB, etc., along with the DM-RS, using single layer beamforming (e.g., instead of transmitting using SFBC-based on CRS for demodulation).

In another example, the eNB 702 can generate the MIB, MIB/SIB, etc. to transmit in a fixed location along with the DM-RS, and a modulation and coding scheme (MCS). The eNB 702 can use an ePDCCH-like structure in this example, as described further herein.

Figure 16:
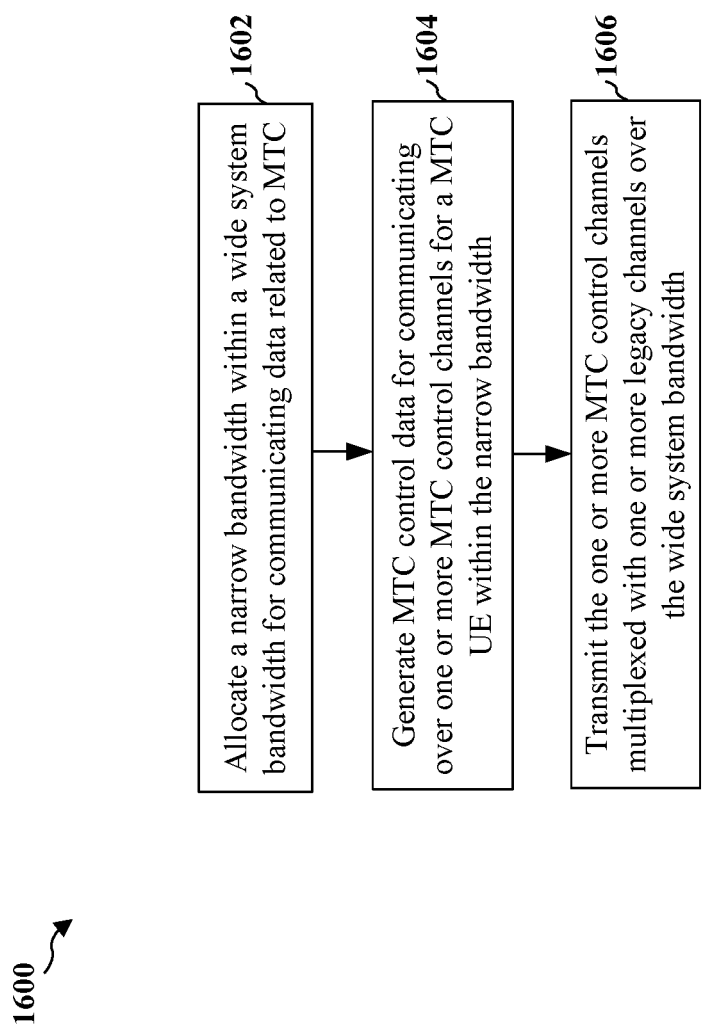
FIG. 16 is a flowchart of a method for providing MTC in a wireless network.

FIG. 16 is a flow chart 1600 of a method for multiplexing MTC with legacy channels. The method may be performed by an eNB. At step 1602, the eNB allocates a narrow bandwidth within a wide system bandwidth for communicating data related to MTC. For example, as shown in FIGS. 10A, 10B, 11, and 12, the eNB may allocate a narrow bandwidth (e.g., narrow bandwidth 1003 in FIGS. 10A and 10B) for MTC within a wide system bandwidth (e.g., wide bandwidth 1002 in FIGS. 10A and 10B). In an aspect, with reference to FIGS. 10A and 10B, the narrow bandwidth 1003 for MTC may be allocated to overlap legacy control resources in the wide system bandwidth. In another aspect, with reference to FIG. 11, the narrow bandwidth 1103 may be allocated to be adjacent to legacy control resources. In such aspect, the size of the legacy control region 1106 can be limited in subframes for MTC. In another aspect, with reference to FIG. 12, the narrow bandwidth 1203 may be separated from legacy control resources, etc.

At step 1604, the eNB may generate MTC control data for communicating over one or more MTC control channels for an MTC UE within the narrow bandwidth. The MTC control data can be generated as a reduced MIB, a combined MIB/SIB, and/or the like, as described herein. The MTC control data can also include RACH information or procedures, other PBCH transmissions or downlink control transmissions, and/or the like. The MTC control data can be generated to conserve signaling and/or mitigate complexity in MTC UE implementation.

At step 1606, the eNB may transmit the one or more MTC control channels multiplexed with one or more legacy channels over the wide system bandwidth. In one example, with reference to FIGS. 10A and 10B, where the MTC control channels overlap the legacy channels (e.g., legacy control channels), the MTC control channels can be punctured in the legacy channels and/or vice versa, depending on which channels are preferred. For example, as shown in FIG. 10A, the legacy control channels 1006 can be punctured with the control channels 902 for MTC to ensure that communication of the MTC control channels takes precedence over the legacy control channels 1006. As another example, as shown in FIG. 10B, the control channels 902 for MTC can be punctured with the legacy control channels 1006 to ensure that communication of the legacy control channels 1006 takes precedence over the MTC control channels 902. In other examples, the MTC control channels can be multiplexed in order to avoid conflict with the legacy channels, if possible. For example, with reference to FIG. 11, the eNB may shift, in time, at least one of the one or more MTC control channels 902 in the wide system bandwidth or at least one of the one or more legacy channels 1106 that overlap the at least one MTC control channel. As another example, the eNB may shift, in frequency, at least one of the one or more MTC control channels in the wide system bandwidth or at least one of the one or more legacy channels that overlap the at least one MTC control channel.

For example, MTC UE 704 may receive the one or more MTC control channels multiplexed with one or more legacy channels over the wide system bandwidth. The MTC UE 704 may decode the MTC control channels and optionally refrain from decoding the legacy channels. The MTC UE 704 may use information from the decoded MTC control channel for subsequent communication. In another embodiment, an apparatus, such as non-MTC UE 706, may receive the one or more MTC control channels multiplexed with one or more legacy channels over the wide system bandwidth. The non-MTC UE 706 may decode the legacy channels and optionally refrain from decoding the MTC control channels.

Figure 17A:
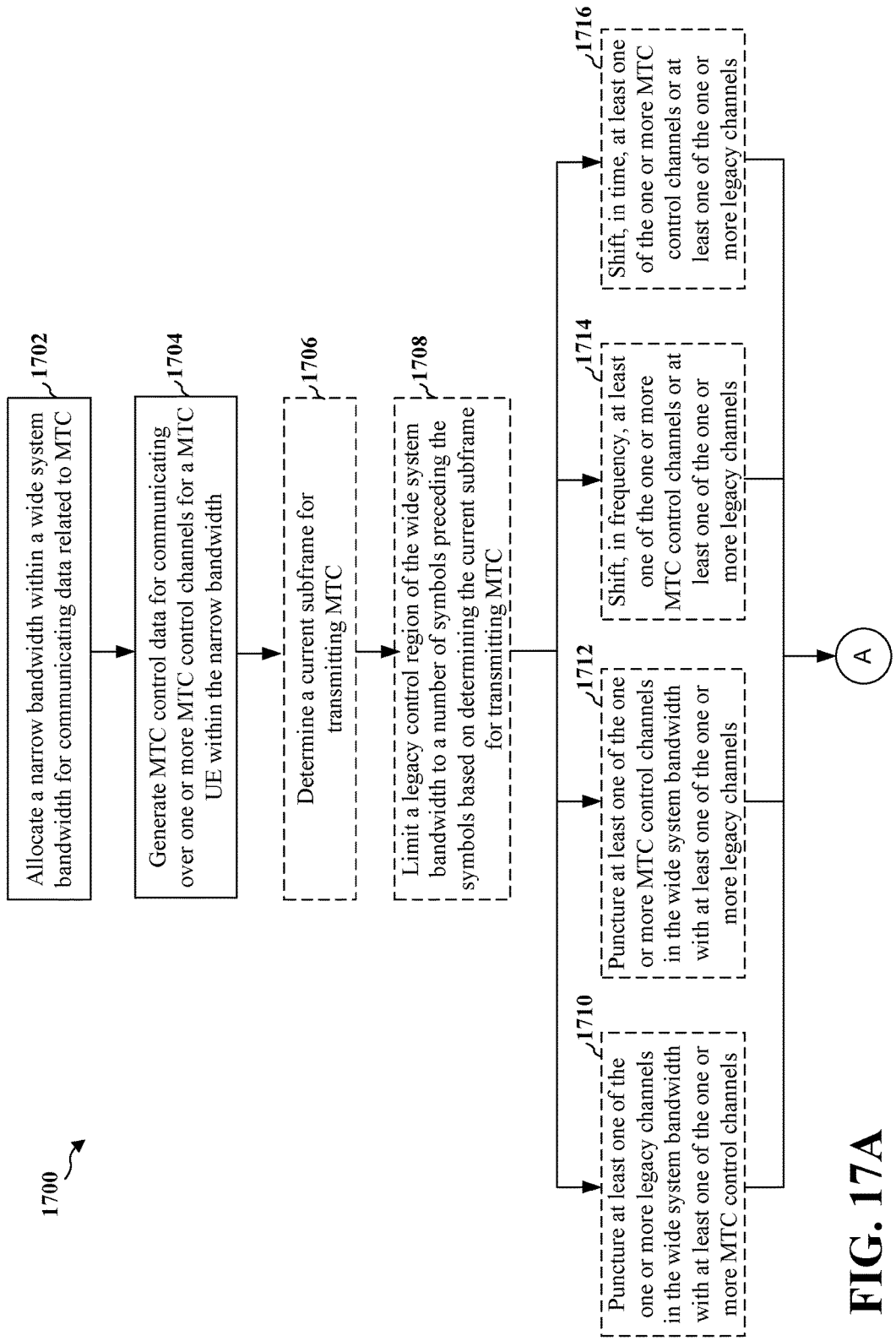
FIGS. 17A and 17B are a flow chart for providing MTC in a wireless network.
Figure 17B:
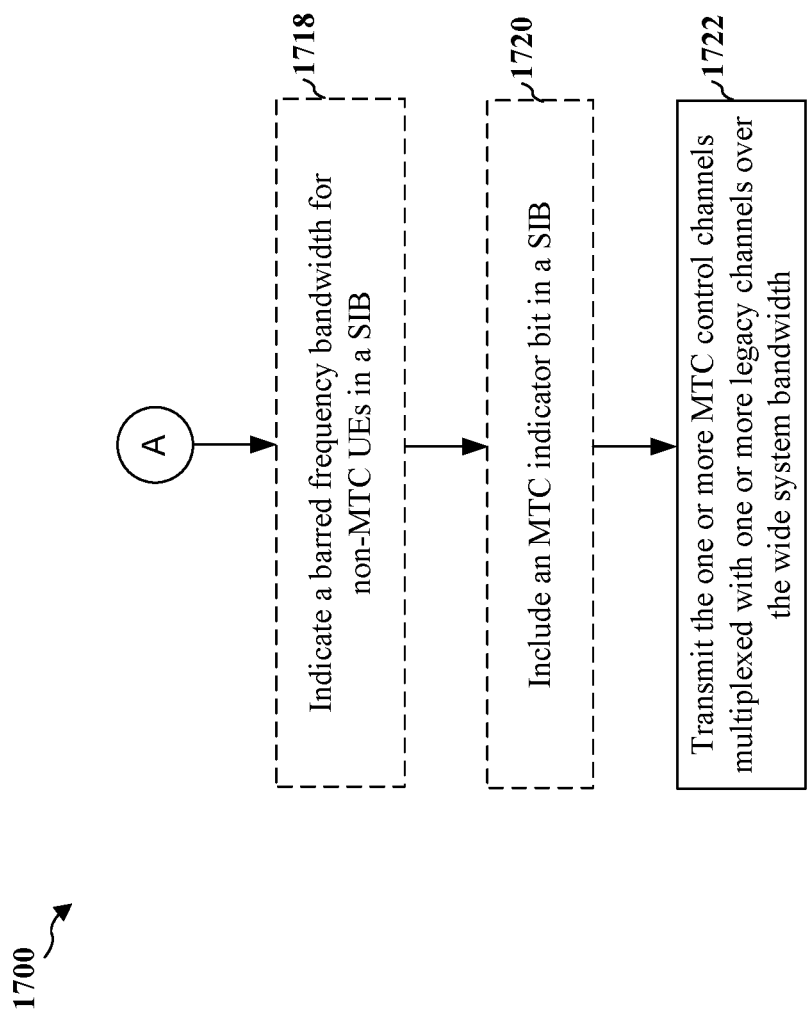

FIGS. 17A and 17B are a flow chart 1700 of a method for providing MTC in a wireless network. The method may be performed by an eNB. At step 1702, the eNB allocates a narrow bandwidth within a wide system bandwidth for communicating data related to MTC. For example, as shown in FIGS. 10A, 10B, 11, and 12, the eNB may allocate a narrow bandwidth (e.g., narrow bandwidth 1003 in FIGS. 10A and 10B) for MTC within a wide system bandwidth (e.g., wide bandwidth 1002 in FIGS. 10A and 10B). In an aspect, with reference to FIGS. 10A and 10B, the narrow bandwidth 1003 for MTC may be allocated to overlap legacy control resources in the wide system bandwidth. In another aspect, with reference to FIG. 11, the narrow bandwidth 1103 may be allocated to be adjacent to legacy control resources. In such aspect, the size of the legacy control region 1106 can be limited in subframes for MTC. In another aspect, with reference to FIG. 12, the narrow bandwidth 1203 may be separated from legacy control resources, etc.

At step 1704, the eNB may generate MTC control data for communicating over one or more MTC control channels for an MTC UE within the narrow bandwidth. The MTC control data can be generated as a reduced MIB, a combined MIB/SIB, and/or the like, as described herein. The MTC control data can also include RACH information or procedures, other PBCH transmissions or downlink control transmissions, and/or the like. The MTC control data can be generated to conserve signaling and/or mitigate complexity in MTC UE implementation.

At step 1706, the eNB may determine a current subframe for transmitting MTC.

At step 1708, the eNB may limit a legacy control region of the wide system bandwidth to a number of symbols preceding the symbols based on the determination of the current subframe for transmitting MTC. The MTC control channel may span symbols in a legacy data region of the wide system bandwidth and the eNB may determine a current subframe for transmitting MTC.

At step 1710, the eNB may puncture at least one of the one or more legacy channels in the wide system bandwidth with at least one of the one or more MTC control channels, where the at least one legacy channel is a legacy control channel that overlaps symbols with the at least one MTC control channel in the wide system bandwidth. For example, as shown in FIG. 10A, the legacy control channels 1006 can be punctured with the control channels 902 for MTC to ensure that communication of the MTC control channels takes precedence over the legacy control channels 1006.

At step 1712, the eNB may puncture at least one of the one or more MTC control channels in the wide system bandwidth with at least one of the one or more legacy channels, where the at least one legacy channel is a legacy control channel that overlaps symbols with the at least one MTC control channel in the wide system bandwidth. For example, as shown in FIG. 10B, the control channels 902 for MTC can be punctured with the legacy control channels 1006 to ensure that communication of the legacy control channels 1006 takes precedence over the MTC control channels 902.

At step 1714, the eNB may shift, in frequency, at least one of the one or more MTC control channels in the wide system bandwidth or at least one of the one or more legacy channels that overlap the at least one MTC control channel.

At step 1716, the eNB may shift, in time, at least one of the one or more MTC control channels in the wide system bandwidth or at least one of the one or more legacy channels that overlap the at least one MTC control channel. For example, with reference to FIG. 11, the eNB may shift, in time, at least one of the one or more MTC control channels 902 in the wide system bandwidth or at least one of the one or more legacy channels 1106 that overlap the at least one MTC control channel.

At step, 1718, the eNB may indicate a barred frequency bandwidth for non-MTC UEs in a system information block. For example, the eNB may indicate a barred frequency bandwidth for non-MTC UEs in a system information block over at least one of the one or more MTC control channels.

At step 1720, the eNB may include an MTC indicator bit in a system information block. In an aspect, the MTC indicator bit may indicate a barred frequency bandwidth for non-MTC UEs. In one example, the eNB may include an MTC indicator bit in a system information block over at least one of the one or more MTC control channels At step 1722, the eNB may transmit the one or more MTC control channels multiplexed with one or more legacy channels over the wide system bandwidth.

For example, the MTC UE 704 may receive the one or more MTC control channels multiplexed with one or more legacy channels over the wide system bandwidth. The MTC UE 704 may decode the MTC control channels and optionally refrain from decoding the legacy channels. The MTC UE 704 may use information from the decoded MTC control channel for subsequent communication. In another embodiment, an apparatus, such as non-MTC UE 706, may receive the one or more MTC control channels multiplexed with one or more legacy channels over the wide system bandwidth. The non-MTC UE 706 may decode the legacy channels and optionally refrain from decoding the MTC control channels.

Figure 18:
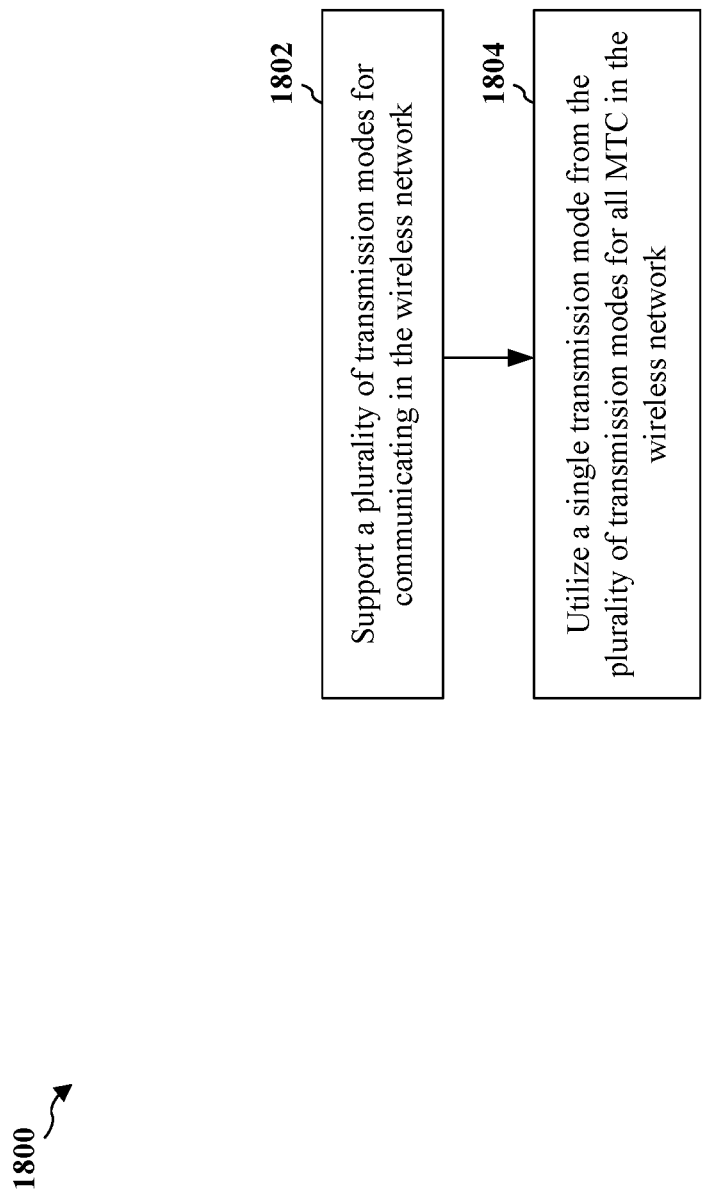
FIG. 18 is a flowchart of a method for providing MTC in a wireless network.

FIG. 18 is a flowchart 1800 of a method for providing machine-type-communication (MTC) in a wireless network. The method may be performed by an eNB. At step 1802, the eNB supports a plurality of transmission modes for communicating in the wireless network. For example, the transmission modes can include at least a portion of the ten transmission modes of LTE as previously described, a new transmission mode that combines SFBC and beamforming described above, and/or the like.

At step 1804, the eNB utilizes a single transmission mode from the plurality of transmission modes for all MTC in the wireless network. The transmission mode may be TM2, TM9, or a combined transmission mode that supports SFBC for some control channels (e.g., MIB/SIB and RACH procedure) while supporting single layer beamforming for other channels.

For example, with reference to FIG. 7, the eNB 702 may send transmissions to the MTC UE 704. The MTC UE 704 may receive transmissions according to the one of the plurality of transmission modes utilized by the eNB 702 for all MTC in the wireless network. Information from the received transmissions is used for subsequent communication. The single transmission mode can be TM2, TM9, or a combined transmission mode that supports SFBC for some control channels (e.g., MIB/SIB and RACH procedure) while supporting single layer beamforming for other channels. In one embodiment, the MTC UE 704 does not support transmission modes other than the one utilized by the eNB 702 for all MTC in the wireless network.

Figure 19:
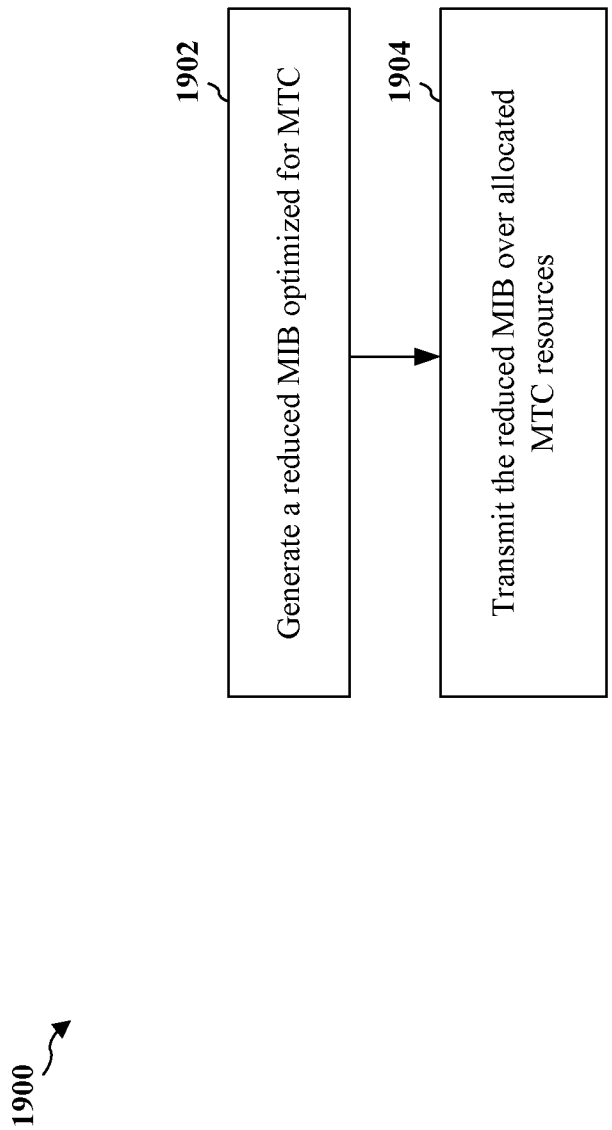
FIG. 19 is a flowchart of a method for providing MTC in a wireless network.

FIG. 19 is a flowchart 1900 of a method for providing MTC in a wireless network. The method may be performed by an eNB.

At step 1902, the eNB generates a reduced MIB optimized for MTC. This reduced MIB can include a portion of data of a MIB in a corresponding wireless network. The reduced MIB can be combined with a SIB, in one example. The reduced SIB can additionally include information to locate and demodulate a subsequent SIB. For example, the reduced MIB may include a SIB that indicates a resource location and a modulation and coding scheme of a next SIB.

At step 1904, the eNB transmits the reduced MIB over allocated MTC resources. In one aspect, the MTC resources may be MTC control resources. This can include transmitting a DM-RS with the MIB (or otherwise associated with the MIB) to facilitate demodulation thereof. In one aspect, an MCS can be included as well. For example, the eNB may transmit the reduced MIB in a fixed location, where the MIB includes a demodulation reference signal and an MCS. In one example, the MCS may be fixed. Moreover, a CRC or other aspect of the MIB transmission can be modified to indicate further information, such as antenna information, as described.

For example, with reference to FIG. 7, the eNB 702 may transmit the reduced MIB and the MTC UE 704 may receive the reduced MIB. The MTC UE 704 may decode the reduced MIB and use the information from the reduced MIB for subsequent communication.

Figure 20:
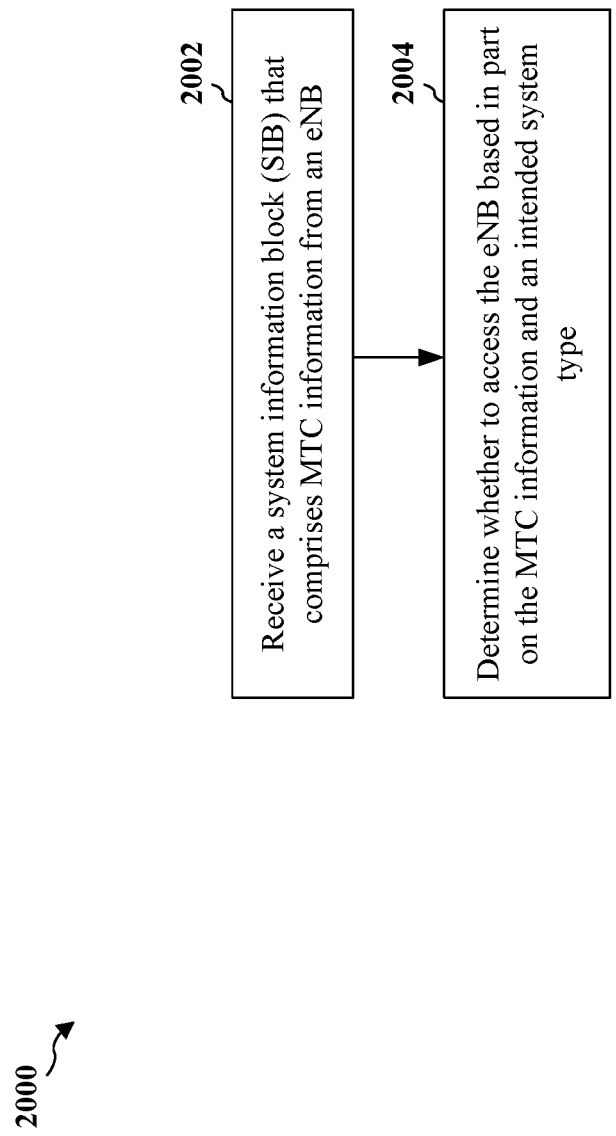
FIG. 20 is a flowchart of a method for providing MTC in a wireless network.

FIG. 20 is a flowchart 2000 of a method for providing MTC in a wireless network. The method may be performed by an MTC UE or a non-MTC UE.

At step 2002, the MTC UE receives an SIB that includes MTC information from an eNB. For example, the MTC information can include frequencies allowed or barred from MTC or non-MTC communications. In another example, the MTC information can include a bit that specifies whether related control data relates to MTC.

At step 2004, the MTC UE determines whether to access the eNB based in part on the MTC information and an intended system type. For example, where the MTC information specifies allowed or barred frequencies, it can be determined whether the frequencies correspond to a system type intended for accessing, and thus if the frequency is allowed or not barred for the system type, an access attempt can be made to the eNB. Similarly, where the MTC information is a bit indicating MTC, if MTC is the intended system type, an access attempt can be made to the eNB.

For example, with reference to FIG. 7, the eNB 702 can communicate the SIB that includes the MTC information to the MTC UE 704. The MTC UE 704 may then determine whether to access the eNB 702 based in part on the MTC information and an intended system type.

Figure 21:
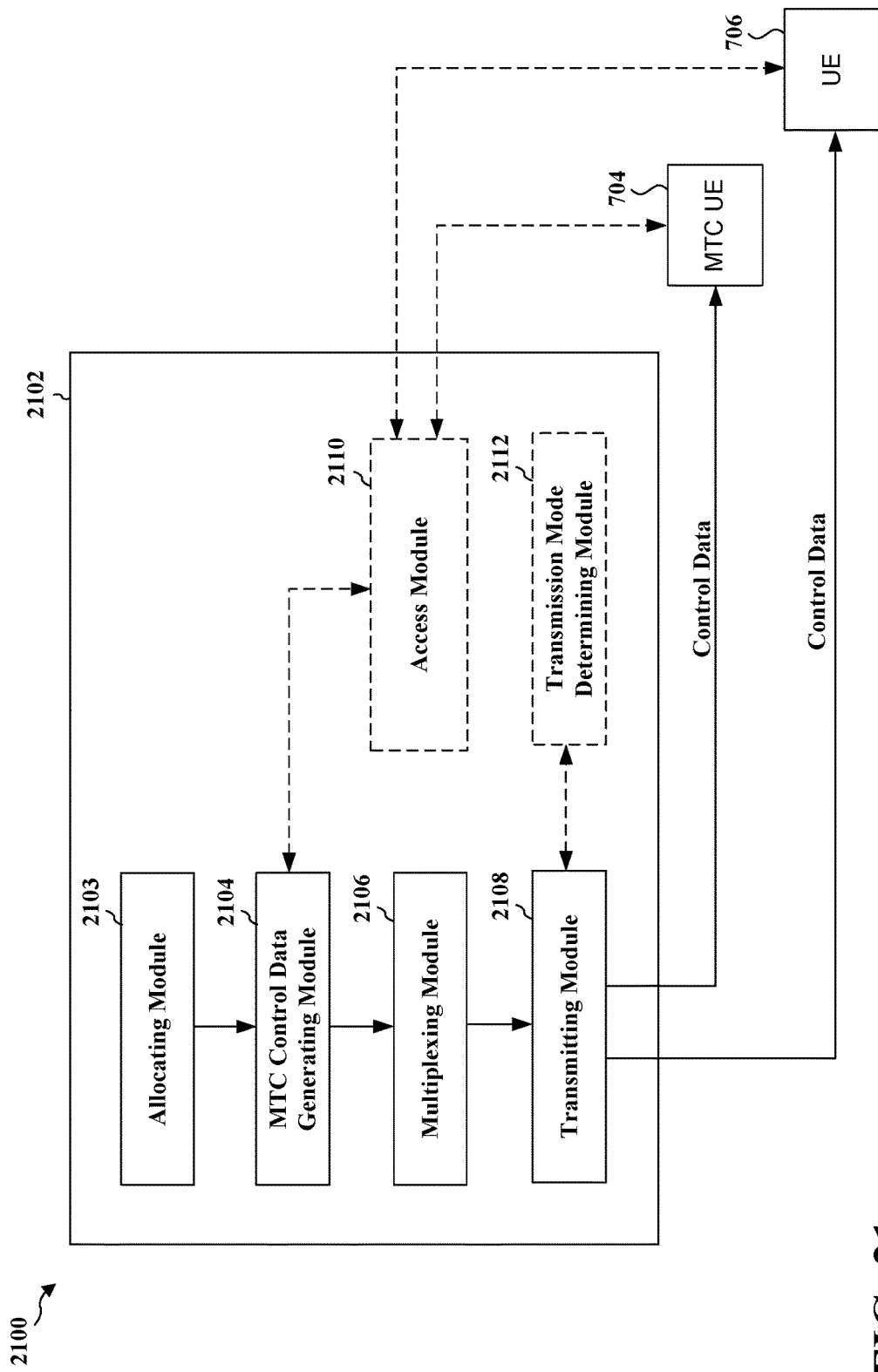
FIG. 21 is a conceptual data flow diagram illustrating the data flow between different modules/means/components in an exemplary apparatus.

FIG. 21 is a conceptual data flow diagram 2100 illustrating the data flow between different modules/means/components in an exemplary apparatus 2102. The apparatus 2102 can be a node, such as an eNB. The apparatus includes an allocating module 2103 that allocates a narrow bandwidth within a wide system bandwidth for communicating data related to MTC, an MTC control data generating module 2104 that generates MTC control data for communicating over one or more MTC control channels for an MTC UE within the narrow bandwidth, a multiplexing module 2106 that punctures at least one of the one or more legacy channels in the wide system bandwidth with at least one of the one or more MTC control channels, punctures at least one of the one or more MTC control channels in the wide system bandwidth with at least one of the one or more legacy channels, shifts, in frequency, at least one of the one or more MTC control channels in the wide system bandwidth or at least one of the one or more legacy channels that overlap the at least one MTC control channel, and shifts, in time, at least one of the one or more MTC control channels in the wide system bandwidth or at least one of the one or more legacy channels that overlap the at least one MTC control channel. The apparatus further includes a transmitting module 2108 that transmits signals that include MTC control data or other data (e.g., in one or more logical channels), transmits the one or more MTC control channels multiplexed with one or more legacy channels over the wide system bandwidth, and determines a current subframe for transmitting MTC. The apparatus further includes an access module 2110 that controls access to one or more systems operated by the eNB by indicating a barred frequency bandwidth for non-MTC UEs in a system information block over at least one of the one or more MTC control channels and/or by including an MTC indicator bit in a system information block over at least one of the one or more MTC control channels, and a transmission mode determining module 2112 that selects or otherwise utilizes a transmission mode defined in the wireless network for transmitting the MTC data. In one example, transmission mode determining module 2112 can select a single transmission mode from the previously discussed transmission modes for transmitting all MTC. In another example, transmission mode determining module 2112 can select TM9 with beamforming and DM-RS-based demodulation for the MTC data. In another example, transmission mode determining module 2112 can specify a new transmission mode (e.g., transmission mode 11) for communicating MTC.

The apparatus may include additional modules that perform each of the steps of the algorithm in the aforementioned flow charts of FIGS. 16, 17A, 17B, 18, and 19. As such, each step in the aforementioned flow charts of FIGS. 16, 17A, 17B, 18, and 19 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Example implementations will now be described with respect to the apparatus 2102. According to an example, transmitting module 2108 can transmit MTC data in standalone resources dedicated for MTC. The standalone resources can relate to existing supported resources in a wireless network for such transmissions, such as 5 MHz or 1.4 MHz in LTE. In some examples, however, multiplexing module 2106 can multiplex the MTC data in a narrow bandwidth portion of the wide system bandwidth, as described in FIGS. 10A, 10B, 11, and 12. Multiplexing module 2106 can accomplish the multiplexing using an overloaded control channel design. For example, multiplexing module 2106 can multiplex obtained MTC control data (e.g., from MTC control data generating module 2104) in a control region of the wireless network related to the wide system bandwidth where the control region occupies the entire system band over one or more symbols.

Where the multiplexed MTC control data collides with other control data in the region, in one example the multiplexing module 2106 can either puncture the MTC control data in the control region to ensure transmission thereof, or puncture the other control data in the MTC region that overlaps the control region of the wide system bandwidth, as described in FIG. 10A. In addition, it is to be appreciated that the puncturing can be different over different subframes and/or can be performed on a per channel basis. Moreover, in one example, the overlapped region can include a control region for the legacy control data and the MTC control data.

In other examples where the multiplexed MTC control data collides with other control data in the region, multiplexing module 2106 can transmit both control data channels without puncturing. In this example, a UE, such as MTC UE 704, can perform interference cancelation or other techniques to distinguish the MTC control data from the other control data and/or vice versa. For example, transmitting module 2108 can set different transmit powers for the MTC control data (e.g., narrow bandwidth control) and the other control data (e.g., wide system bandwidth control) in the overlapped region where the control data collides. For example, transmitting module 2108 can determine such transmit powers based on respective priorities of the control data. This can be done statically, semi-statically, dynamically, etc. In an additional or alternative example where the control data collides, apparatus 2102 can operate the MTC control data and other control data as two separate systems, and can bar UEs, such as MTC UE 704 from accessing one or the other system, as described in further detail below. In any case, multiplexing module 2106 can multiplex the MTC control data with the other control data by completely overloading with no shifting. In this example, multiplexing module 2106 can multiplex certain channels of the MTC control data without corresponding channels of the other control data or vice versa, such as primary synchronization signal (PSS), secondary synchronization signal (SSS), PBCH, etc., while transmitting both versions of other control channels, such as PDCCH. It may be possible, however, to transmit both PBCH of the MTC control channels and other control channels using a one set of physical hybrid automatic repeat/request (HARQ) indicator channel (PH-ICH) indicators for both channels, or two sets of PHICH indicators. Furthermore, in this example, transmitting module 2108 can configure antennas (not shown) of apparatus 2102 to use either the same antenna configuration for both PBCH of the MTC control channels and other control channels or separately signal antenna configuration for the MTC control channels. In other examples, multiplexing module 2106 can multiplex the MTC control data with the other control data by shifting in frequency or over time so at least a portion of the control data does not collide (e.g., PSS, SSS, PBCH, etc.).

Where apparatus 2102 operates the MTC control data and other control data as two separate systems, as described above, access module 2110 can provide one or more mechanisms for indicating the appropriate system to one or more UEs, such as MTC UE 704 or non-MTC UE 706. In one example, access module 2110 can bar a UE from using a certain bandwidth based on the type of UE or requested communication. For example, MTC UE 704 can request connection establishment from apparatus 2102, and access module 2110 can determine whether to allow MTC UE 704 access using an associated bandwidth. For example, where the request relates to a larger bandwidth than utilized for MTC (e.g., a request for 20 MHz, where apparatus uses an MTC bandwidth of 1.4 MHz), access module 2110 can deny access to MTC UE 704. Similarly, where the non-MTC UE 706 requests 1.4 MHz bandwidth, access module 2110 can bar the non-MTC UE 706 from accessing apparatus 2102 using the requested bandwidth.

In one example, access module 2110 can indicate barring information over a SIB broadcasted for the given system (e.g., using MTC control data generating module 2104 to generate the SIB for MTC, or other modules for generating the SIB for other non-MTC control channels). Thus, for example, MTC UE 704 and a non-MTC UE 706 can receive a SIB related to MTC, which can indicate that certain bandwidths are allowed or barred for MTC. Thus, an access determining module (e.g., determining module 2306 in FIG. 23) of the MTC UE 704 and an access determining module of non-MTC UE 706 can obtain the SIB and determine whether a requested bandwidth is allowed for the given system, and the MTC UE 704 and the non-MTC UE 706 can determine whether to access the system based on the SIB information. Similarly, the MTC UE 704 and the non-MTC UE 706 can receive the SIBs related to other control channels and can similarly determine whether to access the related system based on the indicated barred or allowed bandwidths.

In another example where apparatus 2102 operates the MTC control data and other control data as two separate systems, access module 2110 can signal a bit indicating whether a given system is MTC; the bit can be signaled in PBCH or other control channels. Thus, upon receiving PBCH, the access determining module of the MTC UE 704 or the non-MTC UE 706 can determine whether the bit is set and whether the MTC UE 704 or non-MTC UE 706, respectively, intends to access the system indicated by the bit. If the bit is inconsistent with the intended system type, the access determining module of the MTC UE 704 or the access determining module of the non-MTC UE 706 can determine to not attempt access. It is to be appreciated that non-MTC UE 706 may not use the bit or have an access determining module, but may request access to both systems, and use whichever is allowed, for example. Moreover, in an example, where multiplexing module 2106 multiplexes PBCH or SIB for each system, to avoid a UE getting into the 1.4 MHz, the access determining module of MTC UE 704 can ignore barring indicated in SIB (or not include an access determining module at all) since it uses the 1.4 MHz, but the access determining module of the non-MTC UE 706 may determine not to access apparatus 2102 because of the barring indicated in SIB. In SIB, for example, there can be two stages of bandwidth or barred bandwidth indication for MTC. The first SIB can be for all UEs; the MTC UE 704 can ignore barring information in this SIB and can obtain a SIB related to MTC to determine whether it is barred.

It is to be appreciated that the foregoing can be applied to configurations for jointly operating regular systems (e.g., wide system bandwidth) and MTC systems (e.g., narrow bandwidth), but also to jointly operating legacy carrier type operations and new carrier types as well.

In another example, where a control region defined in the wide system bandwidth occupies the entire system band in one or more symbols, multiplexing module 2106 can multiplex the MTC control data outside of the control region. For instance, where the control region for the wireless network occupies symbols 0 through N, where N is a positive integer, multiplexing module 2106 can multiplex the MTC control data (and/or other data) starting at symbol N+1, as shown in FIG. 11. In some examples, for subframes where MTC occurs, multiplexing module 2106 can limit the control region for the wireless network (e.g., to 1 or 2 symbols) to mitigate impact on MTC caused by starting at symbol N+1, which is the symbol following the last symbol in the control region.

In addition, for example, it is to be appreciated that apparatus 2102 can transmit MTC data only in certain subframes (e.g., every 1 out of M subframes, where M is a positive integer), depending on a number of served MTC UEs, a number of served MTC UEs as compared to a number of served non-MTC UEs, etc. The other subframes can use adaptive control region, as defined in LTE, for example. Moreover, for example, the number of subframes for MTC can be modified based on a change in the number of MTC UEs. In the subframes for MTC, the number of symbols reserved for the legacy control region can be fixed (e.g., hardcoded or configured in apparatus 2102 and MTC UE 704), signaled from apparatus 2102 to the MTC UE 704, and/or the like. Furthermore, subframes used for MTC can be signaled from apparatus 2102 to MTC UE 704, in one example.

In yet another example, where the control region defined in the wide system bandwidth does not occupy the entire frequency band over any of the symbols, multiplexing module 2106 can multiplex the MTC control data in another portion of the bandwidth over a subframe. Thus, collision with the control region of the wide system bandwidth can be avoided, as shown in FIG. 12.

Moreover, the wireless network related to the wide system bandwidth can offer multiple transmission modes for utilizing in transmitting data, and in one example, transmission mode determining module 2112 can determine one of the available modes to utilize at transmitting module 2108 for transmitting the MTC data. For example, because data rate requirement for MTC UE 704 is limited, transmission mode determining module 2112 can limit selection to those TMs without support of spatial multiplexing.

Figure 22:
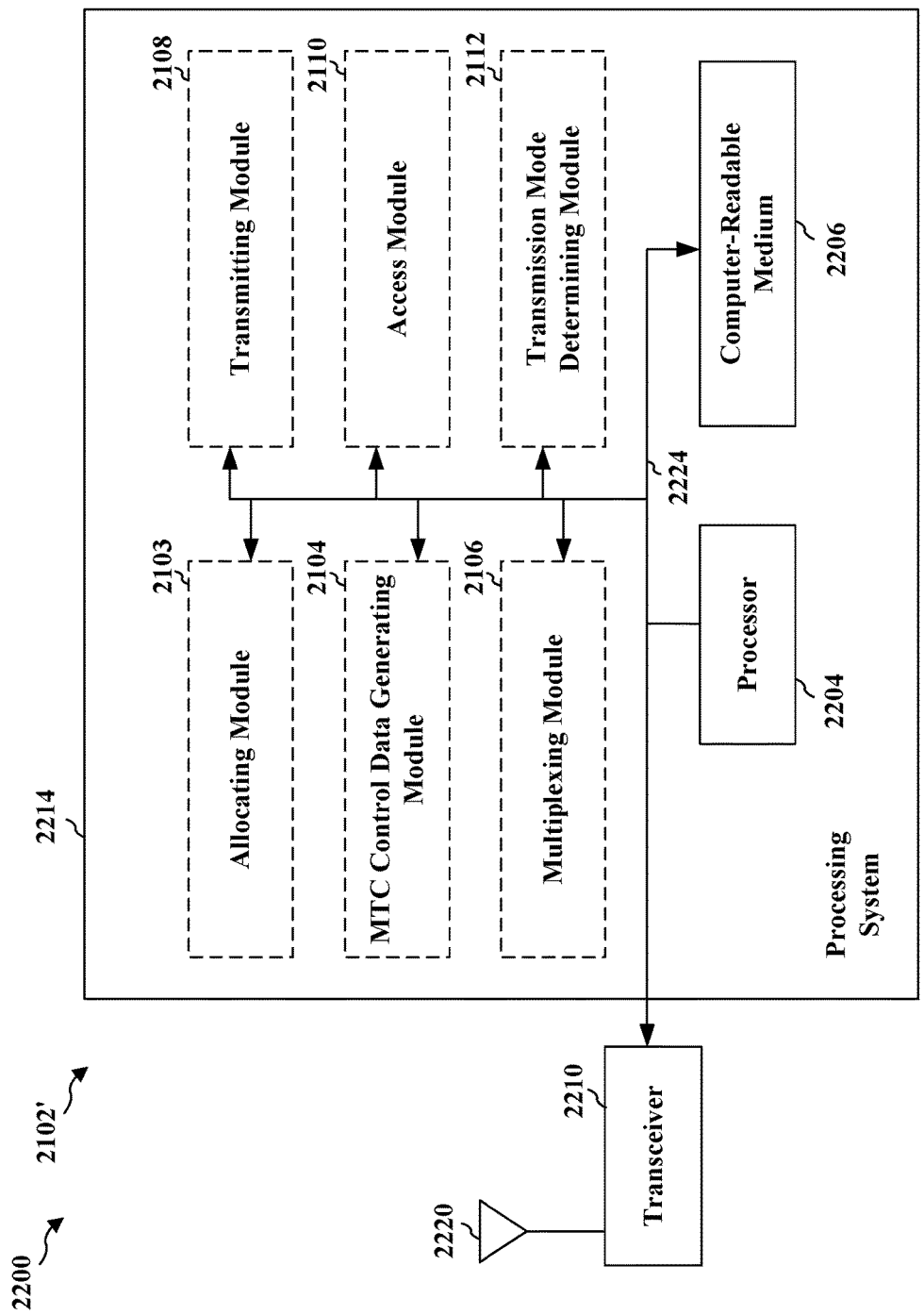
FIG. 22 is a diagram illustrating an example of a hardware implementation for an apparatus employing a processing system.

FIG. 22 is a diagram 2200 illustrating an example of a hardware implementation for an apparatus 2102' employing a processing system 2214. The processing system 2214 may be implemented with a bus architecture, represented generally by the bus 2224. The bus 2224 may include any number of interconnecting buses and bridges depending on the specific application of the processing system 2214 and the overall design constraints. The bus 2224 links together various circuits including one or more processors and/or hardware modules, represented by the processor 2204, the modules 2103, 2104, 2106, 2108, 2110, and 2112, and the computer-readable medium 2206. The bus 2224 may also link various other circuits such as timing sources, peripherals, voltage regulators, and power management circuits, which are well known in the art, and therefore, will not be described any further.

The processing system 2214 may be coupled to a transceiver 2210. The transceiver 2210 is coupled to one or more antennas 2220. The transceiver 2210 provides a means for communicating with various other apparatus over a transmission medium. The transceiver 2210 receives a signal from the one or more antennas 2220, extracts information from the received signal, and provides the extracted information to the processing system 2214. In addition, the transceiver 2210 receives information from the processing system 2214, specifically the transmission module 2108, and based on the received information, generates a signal to be applied to the one or more antennas 2220. The processing system 2214 includes a processor 2204 coupled to a computer-readable medium 2206. The processor 2204 is responsible for general processing, including the execution of software stored on the computer-readable medium 2206. The software, when executed by the processor 2204, causes the processing system 2214 to perform the various functions described supra for any particular apparatus. The computer-readable medium 2206 may also be used for storing data that is manipulated by the processor 2204 when executing software. The processing system further includes at least one of the modules 2103, 2104, 2106, 2108, 2110, and 2112. The modules may be software modules running in the processor 2204, resident/stored in the computer readable medium 2206, one or more hardware modules coupled to the processor 2204, or some combination thereof. The processing system 2214 may be a component of the eNB 610 and may include the memory 676 and/or at least one of the TX processor 616, the RX processor 670, and the controller/processor 675.

In one configuration, the apparatus 2102/2102' for wireless communication includes means for allocating a narrow bandwidth within a wide system bandwidth for communicating data related to MTC, means for generating MTC control data for communicating over one or more MTC control channels for an MTC UE within the narrow bandwidth, means for transmitting the one or more MTC control channels multiplexed with one or more legacy channels over the wide system bandwidth, means for puncturing at least one of the one or more legacy channels in the wide system bandwidth with at least one of the one or more MTC control channels, means for puncturing at least one of the one or more MTC control channels in the wide system bandwidth with at least one of the one or more legacy channels, means for shifting, in frequency, at least one of the one or more MTC control channels in the wide system bandwidth or at least one of the one or more legacy channels that overlap the at least one MTC control channel, means for shifting, in time, at least one of the one or more MTC control channels in the wide system bandwidth or at least one of the one or more legacy channels that overlap the at least one MTC control channel, means for indicating a barred frequency bandwidth for non-MTC UEs in a system information block over at least one of the one or more MTC control channels, means for including an MTC indicator bit in a system information block over at least one of the one or more MTC control channels, means for determining a current subframe for transmitting MTC, means for limiting a legacy control region of the wide system bandwidth to a number of symbols preceding the symbols based on determining the current subframe for transmitting MTC, means for supporting a plurality of transmission modes for communicating in the wireless network, means for utilizing a single transmission mode from the plurality of transmission modes for all MTC in the wireless network, means for generating a reduced master information block (MIB) optimized for MTC, and means for transmitting the reduced MIB over allocated MTC control resources. The aforementioned means may be one or more of the aforementioned modules of the apparatus 2102 and/or the processing system 2214 of the apparatus 2102' configured to perform the functions recited by the aforementioned means. As described supra, the processing system 2214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 23:
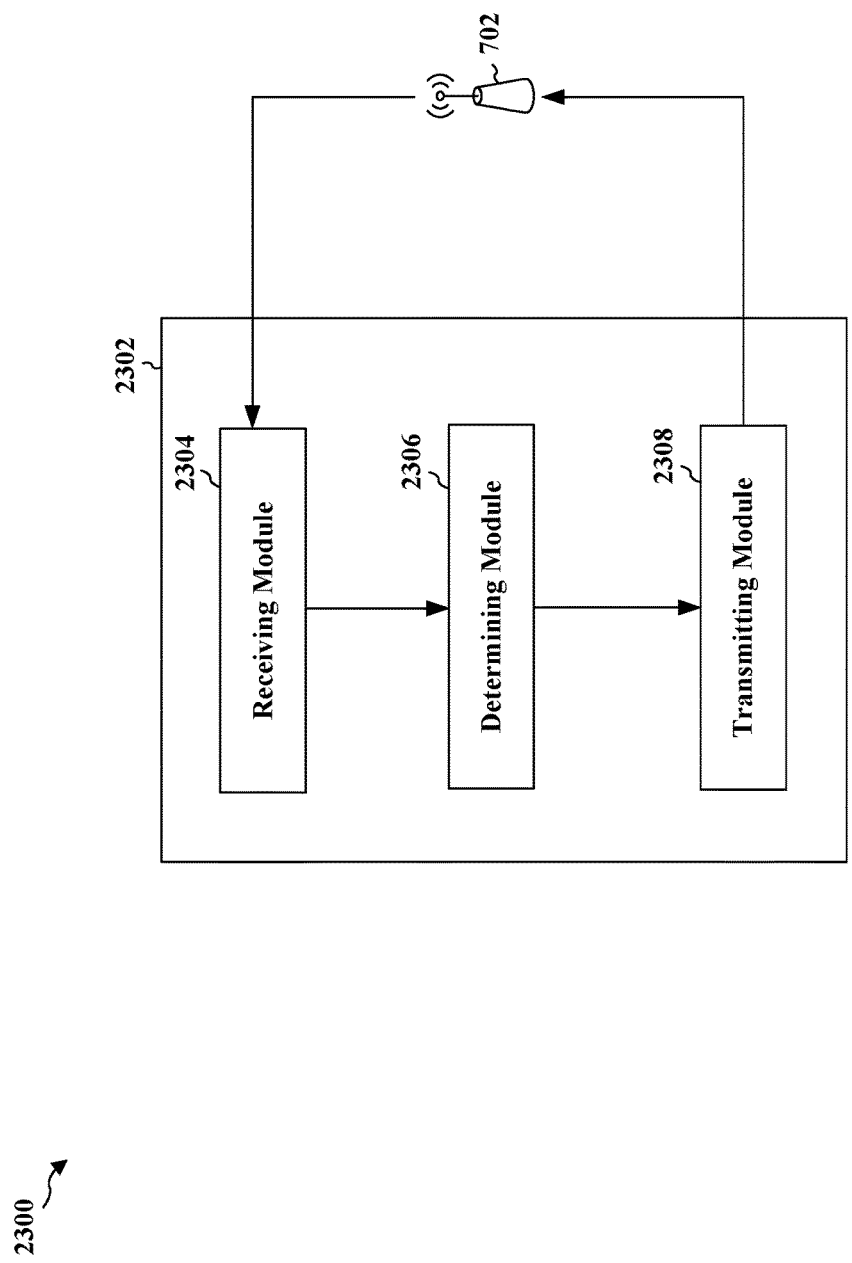
FIG. 23 is a conceptual data flow diagram illustrating the data flow between different modules/means/components in an exemplary apparatus.

FIG. 23 is a conceptual data flow diagram 2300 illustrating the data flow between different modules/means/components in an exemplary apparatus 2302. The apparatus may be an MTC UE. The apparatus includes a receiving module 2304 that receives a SIB that comprises MTC information from an eNB (e.g., eNB 702), a determining module 2306 determines whether to access the eNB based in part on the MTC information and an intended system type, and a transmitting module 2308 for sending transmissions to the eNB 702.

The apparatus may include additional modules that perform each of the steps of the algorithm in the aforementioned flow chart of FIG. 20. As such, each step in the aforementioned flow chart of FIG. 20 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 24:
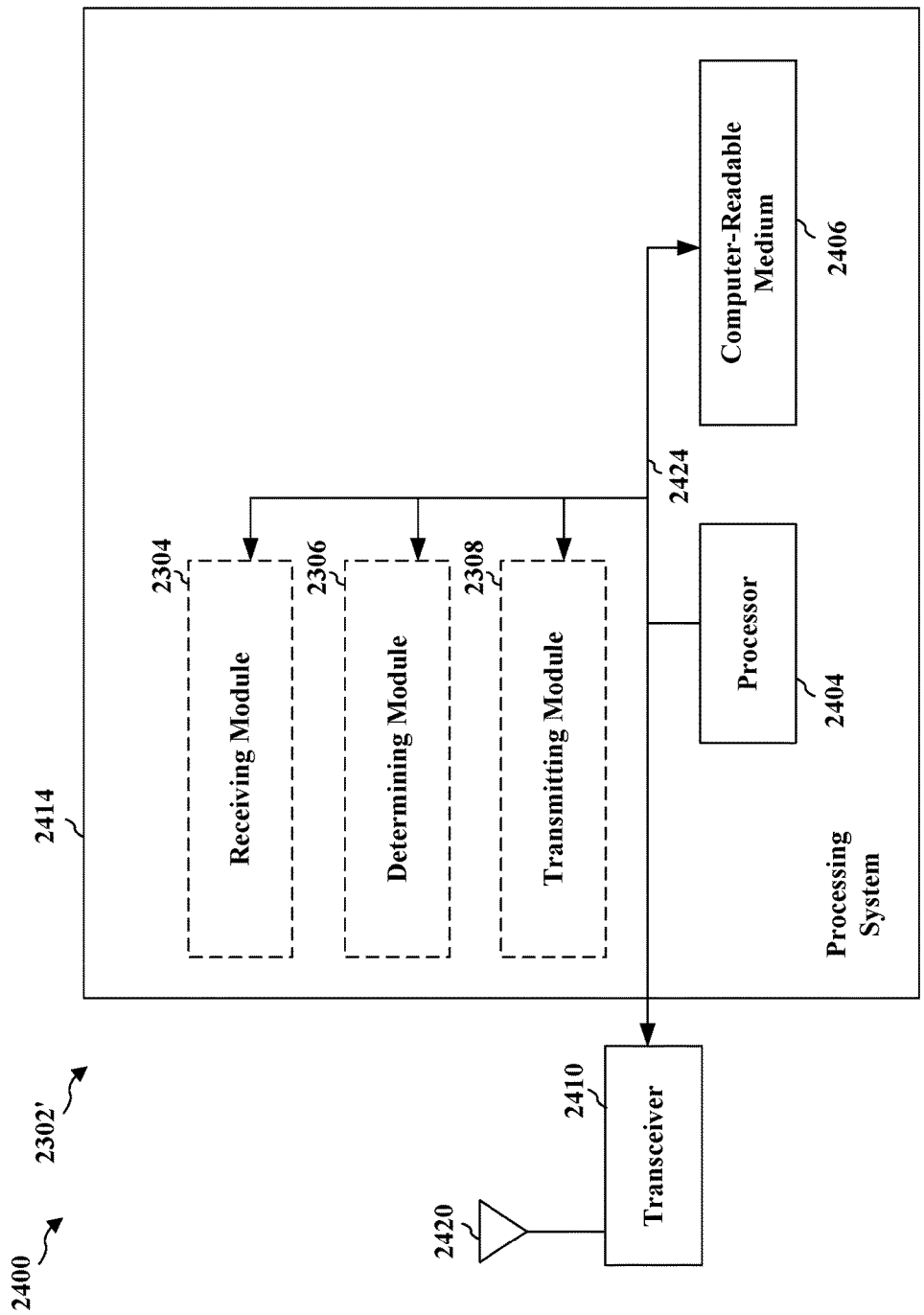
FIG. 24 is a diagram illustrating an example of a hardware implementation for an apparatus employing a processing system.

FIG. 24 is a diagram 2400 illustrating an example of a hardware implementation for an apparatus 2302' employing a processing system 2414. The processing system 2414 may be implemented with a bus architecture, represented generally by the bus 2424. The bus 2424 may include any number of interconnecting buses and bridges depending on the specific application of the processing system 2414 and the overall design constraints. The bus 2424 links together various circuits including one or more processors and/or hardware modules, represented by the processor 2404, the modules 2304, 2306, 2308, and the computer-readable medium 2406. The bus 2424 may also link various other circuits such as timing sources, peripherals, voltage regulators, and power management circuits, which are well known in the art, and therefore, will not be described any further.

The processing system 2414 may be coupled to a transceiver 2410. The transceiver 2410 is coupled to one or more antennas 2420. The transceiver 2410 provides a means for communicating with various other apparatus over a transmission medium. The transceiver 2410 receives a signal from the one or more antennas 2420, extracts information from the received signal, and provides the extracted information to the processing system 2414, specifically the receiving module 2304. In addition, the transceiver 2410 receives information from the processing system 2414, specifically the transmission module 2308, and based on the received information, generates a signal to be applied to the one or more antennas 2420. The processing system 2414 includes a processor 2404 coupled to a computer-readable medium 2406. The processor 2404 is responsible for general processing, including the execution of software stored on the computer-readable medium 2406. The software, when executed by the processor 2404, causes the processing system 2414 to perform the various functions described supra for any particular apparatus. The computer-readable medium 2406 may also be used for storing data that is manipulated by the processor 2404 when executing software. The processing system further includes at least one of the modules 2304, 2306, 2308. The modules may be software modules running in the processor 2304, resident/stored in the computer readable medium 2406, one or more hardware modules coupled to the processor 2404, or some combination thereof. The processing system 2414 may be a component of the UE 650 and may include the memory 660 and/or at least one of the TX processor 668, the RX processor 656, and the controller/processor 659.

In one configuration, the apparatus 2302/2302' for wireless communication includes means for means for receiving a SIB that comprises MTC information from an eNB, and means for determining whether to access the eNB based in part on the MTC information and an intended system type. The aforementioned means may be one or more of the aforementioned modules of the apparatus 2302 and/or the processing system 2414 of the apparatus 2302' configured to perform the functions recited by the aforementioned means. As described supra, the processing system 2414 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Time Division Synchronous Code Division Multiple Access (TD-SCDMA), Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, TD-SCDMA, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

What is claimed is:

1. A method of machine-type-communication (MTC), comprising:
   receiving one or more MTC channels multiplexed with one or more legacy channels over a wide system bandwidth, the one or more MTC channels being multiplexed with the one or more legacy channels over the wide system bandwidth such that the one or more MTC channels do not collide with the one or more legacy channels, the one or more legacy channels including a downlink legacy control channel that does not occupy an entirety of the wide system bandwidth, the one or more MTC channels being multiplexed in a same slot as the one or more legacy channels, the one or more MTC channels occupying a narrowband within the wide system bandwidth, and the narrowband being dedicated for MTC, wherein at least one of the one or more MTC channels multiplexed in the same slot as the one or more legacy channels comprises an MTC control region comprising one or more symbols of the same slot and an MTC data region including a remaining plurality of symbols of the same slot;
   decoding at least one of the MTC channels or the legacy channels; and
   utilizing information from the at least one of the decoded MTC channels or the decoded legacy channels for subsequent communication.

2. The method of claim 1, further comprising:
   receiving an indicator bit via a physical broadcast channel (PBCH), the indicator bit indicating if a system is configured for MTC; and
   determining if the system is configured for MTC based at least in part on the indicator bit.

3. The method of claim 1, further comprising:
   receiving a first MTC indicator bit in a first system information block, the first MTC indicator bit indicating a barred first frequency bandwidth for non-MTC UEs; and
   receiving a second MTC indicator bit in a second system information block, the second MTC indicator bit indicating a barred second frequency bandwidth for one or more MTC UEs.

4. The method of claim 3, further comprising:
   determining if the one or more MTC UEs are barred from the second frequency bandwidth based at least in part on the second MTC indicator bit in the second system information block.

5. The method of claim 4, further comprising:
   refraining from determining if the one or more MTC UEs are barred from the first frequency.

6. The method of claim 1, wherein a narrow bandwidth is allocated within the wide system bandwidth for MTC communication.

7. The method of claim 1, wherein the one or more MTC channels multiplexed with one or more legacy channels are received by an MTC device and wherein decoding at least one of the MTC channels or the legacy channels comprises decoding at least one MTC channel and does not include decoding any of the one or more multiplexed legacy channels.

8. The method of claim 1, wherein the same slot is included in a first subframe, and where a number M−1 of subframes subsequent to the first subframe do not include an MTC channel, where M is an integer greater than 1.

9. The method of claim 1, wherein the one or more MTC channels begin at a symbol following a last symbol in a number of symbols for a legacy control region of the legacy channels.

10. An apparatus for machine-type-communication (MTC), comprising:
    a memory; and
    at least one processor coupled to the memory and configured to:
       receive one or more MTC channels multiplexed with one or more legacy channels over a wide system bandwidth, the one or more MTC channels being multiplexed with the one or more legacy channels over the wide system bandwidth such that the one or more MTC channels do not collide with the one or more legacy channels, the one or more legacy channels including a downlink legacy control channel that does not occupy an entirety of the wide system bandwidth, the one or more MTC channels being multiplexed in a same slot as the one or more legacy channels, the one or more MTC channels occupying a narrowband within the wide system bandwidth, and the narrowband being dedicated for MTC, wherein at least one of the one or more MTC channels multiplexed in the same slot as the one or more legacy channels comprises an MTC control region comprising one or more symbols of the same slot and an MTC data region including a remaining plurality of symbols of the same slot;
       decode at least one of the MTC channels or the legacy channels; and
       utilize information from the at least one of the decoded MTC channels or the decoded legacy channels for subsequent communication.

11. The apparatus of claim 10, wherein the at least one processor is further configured to:
    receive an indicator bit via a physical broadcast channel (PBCH), the indicator bit indicating if a system is configured for MTC; and
    determine if the system is configured for MTC based at least in part on the indicator bit.

12. The apparatus of claim 10, wherein the at least one processor is further configured to:
    receive a first MTC indicator bit in a first system information block, the first MTC indicator bit indicating a barred first frequency bandwidth for non-MTC UEs; and
    receive a second MTC indicator bit in a second system information block, the second MTC indicator bit indicating a barred second frequency bandwidth for one or more MTC UEs.

13. The apparatus of claim 12, wherein the at least one processor is further configured to:
    determine if the one or more MTC UEs are barred from the second frequency bandwidth based at least in part on the second MTC indicator bit in the second system information block.

14. The apparatus of claim 13, wherein the at least one processor is further configured to:
    refrain from determining if the one or more MTC UEs are barred from the first frequency.

15. The apparatus of claim 10, wherein a narrow bandwidth is allocated within the wide system bandwidth for MTC communication.

16. The apparatus of claim 10, wherein the one or more MTC channels multiplexed with one or more legacy channels are received by an MTC device and wherein decoding at least one of the MTC channels or the legacy channels comprises decoding at least one MTC channel and does not include decoding any of the one or more multiplexed legacy channels.

17. The apparatus of claim 10, wherein the one or more MTC channels span symbols in a legacy data region of the wide system bandwidth.

18. The apparatus of claim 10, wherein the one or more MTC channels begin at a symbol following a last symbol in a number of symbols for a legacy control region of the legacy channels.

19. A non-transitory computer-readable medium storing computer executable code for machine-type-communication (MTC), comprising code for:
receiving one or more MTC channels multiplexed with one or more legacy channels over a wide system bandwidth, the one or more MTC channels being multiplexed with the one or more legacy channels over the wide system bandwidth such that the one or more MTC channels do not collide with the one or more legacy channels, the one or more legacy channels including a downlink legacy control channel that does not occupy an entirety of the wide system bandwidth, the one or more MTC channels being multiplexed in a same slot as the one or more legacy channels, the one or more MTC channels occupying a narrowband within the wide system bandwidth, and the narrowband being dedicated for MTC, wherein at least one of the one or more MTC channels multiplexed in the same slot as the one or more legacy channels comprises an MTC control region comprising one or more symbols of the same slot and an MTC data region including a remaining plurality of symbols of the same slot;
decoding at least one of the MTC channels or the legacy channels; and
utilizing information from the at least one of the decoded MTC control channels or the decoded legacy channels for subsequent communication.

20. The non-transitory computer-readable medium of claim 19, further comprising code for:
receiving an indicator bit via a physical broadcast channel (PBCH), the indicator bit indicating if a system is configured for MTC; and
determining if the system is configured for MTC based at least in part on the indicator bit.

21. The non-transitory computer-readable medium of claim 19, further comprising code for:
receiving a first MTC indicator bit in a first system information block, the first MTC indicator bit indicating a barred first frequency bandwidth for non-MTC UEs; and
receiving a second MTC indicator bit in a second system information block, the second MTC indicator bit indicating a barred second frequency bandwidth for one or more MTC UEs.

22. The non-transitory computer-readable medium of claim 21, further comprising code for:
determining if the one or more MTC UEs are barred from the second frequency bandwidth based at least in part on the second MTC indicator bit in the second system information block.

23. The non-transitory computer-readable medium of claim 22, further comprising code for:
refraining from determining if the one or more MTC UEs are barred from the first frequency.

24. The non-transitory computer-readable medium of claim 19, wherein a narrow bandwidth is allocated within the wide system bandwidth for MTC communication.

25. The non-transitory computer-readable medium of claim 19, wherein the one or more MTC channels multiplexed with one or more legacy channels are received by an MTC device and wherein decoding at least one of the MTC channels or the legacy channels comprises decoding at least one MTC channel and does not include decoding any of the one or more multiplexed legacy channels.

\* \* \* \* \*